United States Patent
Kodera

(10) Patent No.: US 11,611,670 B2
(45) Date of Patent: Mar. 21, 2023

(54) COMPUTER-READABLE MEDIUM, INFORMATION PROCESSING DEVICE, AND COMMUNICATION SYSTEM TO DISPLAY IMAGES REGARDING PROCESSING FUNCTIONS EXECUTABLE BY IMAGE PROCESSING DEVICE

(71) Applicant: Brother Kogyo Kabushiki Kaisha, Nagoya (JP)

(72) Inventor: Nobukazu Kodera, Okazaki (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 17/327,945

(22) Filed: May 24, 2021

(65) Prior Publication Data

US 2021/0377403 A1     Dec. 2, 2021

(30) Foreign Application Priority Data

May 28, 2020   (JP) .............................. JP2020-092866

(51) Int. Cl.
*H04N 1/00* (2006.01)
*H04N 1/44* (2006.01)

(52) U.S. Cl.
CPC ..... *H04N 1/00474* (2013.01); *H04N 1/00411* (2013.01); *H04N 1/00432* (2013.01); *H04N 1/00464* (2013.01); *H04N 1/00506* (2013.01); *H04N 1/00514* (2013.01); *H04N 1/4433* (2013.01); *H04N 2201/0094* (2013.01)

(58) Field of Classification Search
CPC .......... H04N 1/00474; H04N 1/00411; H04N 1/00432; H04N 1/00464; H04N 1/00514
See application file for complete search history.

(56) References Cited

U.S. PATENT DOCUMENTS

| | | | |
|---|---|---|---|
| 2005/0105129 A1* | 5/2005 | Takahashi | H04N 1/00432 358/1.15 |
| 2012/0075658 A1 | 3/2012 | Yasui et al. | |
| 2013/0246509 A1* | 9/2013 | Sakiyama | H04N 1/00424 709/203 |

(Continued)

FOREIGN PATENT DOCUMENTS

| | | |
|---|---|---|
| JP | 2012-068974 A | 4/2012 |
| JP | 2016-081113 A | 5/2016 |

*Primary Examiner* — Nicholas Pachol
(74) *Attorney, Agent, or Firm* — Burr Patent Law, PLLC

(57) ABSTRACT

A non-transitory computer-readable medium stores computer-readable instructions configured to, when executed by a processor of an information processing device, cause the information processing device to obtain image data of an image processing screen image regarding an image processing function from the image processing device and control the display to display the image processing screen image, when transmitting an image data request to the image processing device while an image processing input screen is displayed on the display, and obtain image data of a non-image processing screen image regarding a non-image processing function from the image processing device and control the display to display the non-image processing screen image, when transmitting an image data request to the image processing device while a non-image processing input screen is displayed on the display.

11 Claims, 15 Drawing Sheets

(56) References Cited

U.S. PATENT DOCUMENTS

2014/0363186 A1* 12/2014 Otsuka .................. G06F 3/1285
                                                        399/75
2016/0105577 A1    4/2016 Koike
2018/0091685 A1*  3/2018 Morita ............... H04N 1/00424

* cited by examiner

| User ID | Password |
|---------|----------|
| UserA | PassA |
| UserB | PassB |
| UserC | PassC |

FIG. 14

| User ID | User-Executable Functions |
|---------|---------------------------|
| UserA | Print, Scan, General |
| UserB | Print, General |
| UserC | Print, Scan, General |

FIG. 15

| User ID | Permission Information |
|---------|------------------------|
| UserA | Administrator |
| UserB | General |
| UserC | General |

FIG. 16

| Function | Major Item | Minor Item | Administrator | General |
|---|---|---|---|---|
| Print | Print | Toner Saving | TRUE | TRUE |
| | | Error Cancellation | TRUE | TRUE |
| | Tray | Printing Paper Type | TRUE | TRUE |
| | | Printing Paper Size | TRUE | TRUE |
| | Duplex Printing | ... | TRUE | TRUE |
| | Print Color | ... | TRUE | TRUE |
| | Color Correction | ... | TRUE | FALSE |
| | Automatic Color Shift Correction | ... | TRUE | FALSE |
| | Direct Print | ... | TRUE | TRUE |
| Scan | ScantoUSB | Resolution | TRUE | TRUE |
| | | File Format | TRUE | TRUE |
| | | Scanning Document Size | TRUE | TRUE |
| | | File Size | TRUE | TRUE |
| | FTP/Network File Scan | ... | TRUE | FALSE |
| | FTP/Network File Scan Profile | ... | TRUE | FALSE |
| General | Status | Device Status | TRUE | TRUE |
| | | Remaining Toner Amount | TRUE | TRUE |
| | | Language | TRUE | FALSE |
| | | Device Location | TRUE | FALSE |
| | Reload Interval | ... | TRUE | TRUE |
| | Maintenance Information | ... | TRUE | TRUE |
| | Lists and Reports | ... | TRUE | TRUE |
| | ... | ... | TRUE | FALSE |
| Administrator Setting | ... | ... | TRUE | FALSE |
| Network | ... | ... | TRUE | FALSE |
| ... | | | | |

FIG. 17

COMPUTER-READABLE MEDIUM, INFORMATION PROCESSING DEVICE, AND COMMUNICATION SYSTEM TO DISPLAY IMAGES REGARDING PROCESSING FUNCTIONS EXECUTABLE BY IMAGE PROCESSING DEVICE

CROSS-REFERENCE TO RELATED APPLICATION

This application claims priority under 35 U.S.C. § 119 from Japanese Patent Application No. 2020-092866 filed on May 28, 2020. The entire subject matter of the application is incorporated herein by reference.

BACKGROUND

Technical Field

Aspects of the present disclosure are related to a computer-readable medium, an information processing device, and a communication system to display a plurality of display images regarding a plurality of processing functions executable by an image processing device.

Related Art

A technology has been known in which an image processing device (e.g., a printer and a scanner) transmits image data of display images regarding processing functions executable by the image processing device to an information processing device in response to a request from the information processing device, and the information processing device displays the display images regarding the processing functions executable by the image processing device based on the image data received from the image processing device.

SUMMARY

Aspects of the present disclosure are advantageous to provide one or more techniques to improve convenience in causing an information processing device to display an intended one of a plurality of display images regarding a plurality of processing functions executable by an image processing device.

According to aspects of the present disclosure, a non-transitory computer-readable medium is provided, which stores computer-readable instructions executable by a processor of an information processing device that includes a communication interface and a display. The instructions are configured to, when executed by the processor, cause the information processing device to control the display to display an input screen configured to accept an instruction to cause an image processing device to perform a particular function, obtain image data of an image processing screen image regarding a specified image processing function from the image processing device via the communication interface and control the display to display the image processing screen image, when transmitting an image data request to the image processing device via the communication interface while an image processing input screen is displayed as the input screen on the display, the image processing input screen being configured to accept an instruction to cause the image processing device to perform the specified image processing function as the particular function, and obtain image data of a non-image processing screen image regarding a non-image processing function from the image processing device via the communication interface and control the display to display the non-image processing screen image, when transmitting an image data request to the image processing device via the communication interface while a non-image processing input screen is displayed as the input screen on the display, the non-image processing input screen being configured to accept an instruction to cause the image processing device to perform the non-image processing function as the particular function.

According to aspects of the present disclosure, further provided is an information processing device that includes a communication interface configured to communicate with an image processing device, a display, and a controller. The controller is configured to control the display to display an input screen configured to accept an instruction to cause the image processing device to perform a particular function, obtain, from the image processing device, image data of an image processing screen image regarding an image processing function and control the display to display the image processing screen image, when transmitting an image data request for image data of a display image to the image processing device while an image processing input screen is displayed as the input screen on the display, the image processing input screen being configured to accept an instruction to cause the image processing device to perform the image processing function as the particular function, and obtain, from the image processing device, image data of a non-image processing screen image regarding a non-image processing function and control the display to display the non-image processing screen image, when transmitting an image data request to the image processing device while a non-image processing input screen is displayed as the input screen on the display, the non-image processing input screen being configured to accept an instruction to cause the image processing device to perform the non-image processing function as the particular function.

According to aspects of the present disclosure, further provided is a communication system that includes an image processing device and an information processing device. The information processing device includes a first communication interface configured to communicate with the image processing device, a display, a user interface, and a first controller. The first controller is configured to control the display to display an input screen configured to accept an instruction to cause the image processing device to perform a particular function, transmit, to the image processing device, a request for image data of an image processing screen image regarding an image processing function, when accepting via the user interface a user operation to request image data of a display image while an image processing input screen is displayed as the input screen on the display, the image processing input screen being configured to accept an instruction to cause the image processing device to perform the image processing function as the particular function, control the display to display the image processing screen image, when receiving the image data of the image processing screen image from the image processing device, transmit, to the image processing device, a request for image data of a non-image processing screen image regarding a non-image processing function, when accepting via the user interface a user operation to request image data of a display image while a non-image processing input screen is displayed as the input screen on the display, the non-image processing input screen being configured to accept an instruction to cause the image processing device to perform the non-image processing function as the particular function, and control the display to display the non-image processing screen image, when receiving the image data of the non-image processing screen image from the image processing device. The image processing device includes a second communication interface configured to communicate with the image processing device, and a second controller. The second controller is configured to transmit, to the information processing device, the image data of the image processing screen image regarding the image processing function, when receiving the request for the image data of the image processing screen image, and transmit, to the information processing device, the image data of the non-image processing screen image regarding the non-image processing function, when receiving the request for the image data of the non-image processing screen image.

BRIEF DESCRIPTION OF THE ACCOMPANYING DRAWINGS

FIG. 14 shows map data in which each user ID is associated with a corresponding password, in the illustrative embodiment according to one or more aspects of the present disclosure.

FIG. 15 shows map data in which each user ID is associated with corresponding user-executable functions, in the illustrative embodiment according to one or more aspects of the present disclosure.

FIG. 16 shows map data in which each user ID is associated with corresponding permission information, in the illustrative embodiment according to one or more aspects of the present disclosure.

FIG. 17 shows map data in which each setting item for each processing function is associated with corresponding display permission with respect to each permission information, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings. The following illustrative embodiment is merely an example of the technical concept according to aspects of the present disclosure. It is to be understood that aspects of the present disclosure may be changed or modified within the scope of the technical concept as will be expressed below. For instance, a sequence of executing below-mentioned processes and operations may be changed as needed as long as the change does not distort the gist of the technical concept as will be expressed below.

Figure 1:
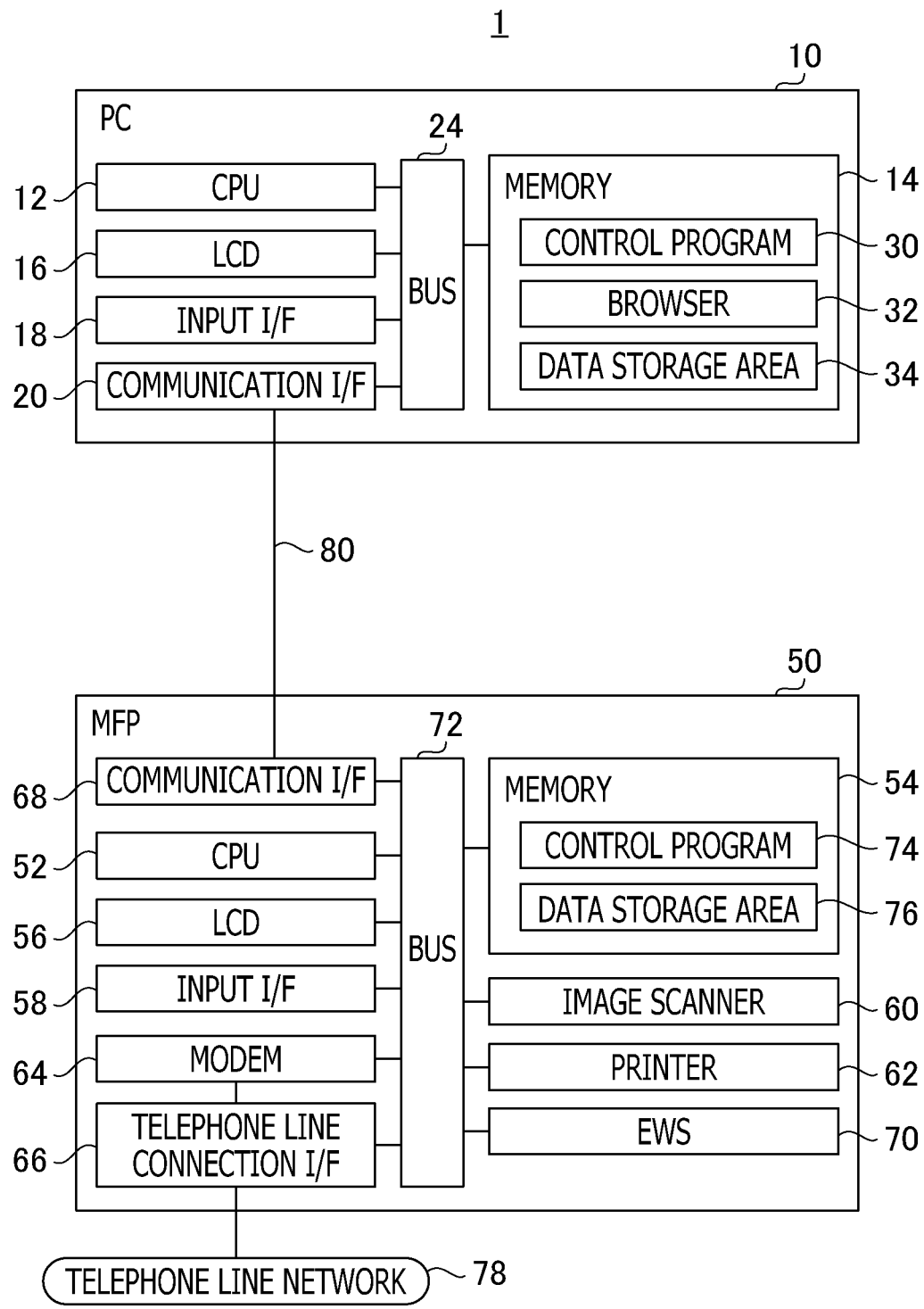
FIG. 1 is a block diagram of a communication system including a PC and a multi-function peripheral (hereinafter referred to as an "MFP"), in an illustrative embodiment according to one or more aspects of the present disclosure.

FIG. 1 is a block diagram of a communication system 1 in the illustrative embodiment. The communication system 1 shown in FIG. 1 includes a PC 10 and a multi-function peripheral (hereinafter referred to as an "MFP") 50.

The PC 10 includes a CPU 12, a memory 14, an LCD 16, an input I/F ("I/F" is an abbreviation of "interface") 18, and a communication I/F 20. These elements included in the PC 10 are communicably interconnected via a bus 24.

The PC 10 is configured to communicate with the MFP 50 via the communication I/F 20 and a communication path 80. For instance, communication methods applicable to the communication via the communication path 80 may include wired LAN communication, USB communication, Wi-Fi (registered trademark) communication, and Bluetooth (registered trademark) communication.

The CPU 12 is configured to execute processing according to a control program 30 stored in the memory 14. For instance, the control program 30 is an application program for causing the MFP 50 to perform image processing. Further, a browser 32 is an application program for displaying web pages on the LCD 16. Specifically, the browser 32 is configured to, when executed by the CPU 12, cause the CPU 12 to obtain various kinds of information from the MFP 50 via the communication path 80 and to display, on the LCD 16, web pages based on the obtained information. Hereinafter, the CPU 12 executing a program (e.g., the control program 30) may be represented simply by a name of the program. For instance, "the control program 30" in the following description may represent "the CPU 12 executing the control program 30."

The memory 14 has a data storage area 34. The data storage area 34 is an area to store data and/or information necessary for the CPU 12 to execute the control program 30. The memory 14 includes one or more storage devices. For instance, the memory 14 may have a combination of at least two of a RAM, a ROM, a flash memory, an HDD, a portable storage medium (e.g., a USB memory attachable to and removable from the PC 10), and a buffer of the CPU 12. It is noted that the CPU 12 and the memory 14 storing the control program 30 form a controller to control operations by the PC 10.

The LCD 16 is configured to display various kinds of information regarding the PC 10. It is noted that, instead of the LCD 16, the PC 10 may have another display device such as an organic electroluminescence display. The input I/F 18 includes a keyboard and a mouse. The input I/F 18 is an interface for inputting user operations therethrough. The input I/F 18 may include a membranous touch sensor superimposed on a display screen of the LCD 16, instead of or in addition to the keyboard.

The MFP 50 includes a CPU 52, a memory 54, an LCD 56, an input I/F 58, an image scanner 60, a printer 62, a modem 64, a telephone line connection I/F 66, a communication I/F 68, and an EWS ("EWS" is an abbreviation of "Embedded Web Server") 70. These elements included in the MFP 50 are communicably interconnected via a bus 72.

The CPU 52 is configured to execute processing according to a control program 74 stored in the memory 54. The control program 74 is a program for generating image data of a display image in response to a request from the PC 10. Hereinafter, the CPU 52 executing a program (e.g., the control program 74) may be represented simply by a name of the program. For instance, "the control program 74" in the following description may represent "the CPU 52 executing the control program 74."

The memory 54 includes one or more storage devices. For instance, the memory 54 may have a combination of at least two of a RAM, a ROM, a flash memory, an HDD, a portable storage medium (e.g., a USB memory attachable to and removable from the PC 10), and a buffer of the CPU 52. The memory 54 has a data storage area 76. The data storage area 76 is an area to store data and/or information necessary for the CPU 52 to execute the control program 74. It is noted that the CPU 52 and the memory 54 storing the control program 74 form a controller to control operations by the MFP 50.

Each of the memory 54 of the MFP 50 and the memory 14 of the PC 10 may include a non-transitory computer-readable storage medium. Examples of the non-transitory computer-readable storage medium may include recording media such as a CD-ROM and a DVD-ROM, as well as the above examples of the storage devices. The non-transitory computer-readable storage medium is also a tangible medium. On the other hand, an electrical signal carrying a program downloaded from a server on the Internet is a computer-readable signal medium, which is of a type of computer-readable medium, but is not included in examples of the non-transitory computer-readable storage medium.

The LCD 56 is configured to display various kinds of information regarding the MFP 50. It is noted that, instead of the LCD 16, the MFP 50 may have another display device such as an organic electroluminescence display. The input I/F 58 includes, for instance, a touch panel integrated with the LCD 56. The input I/F 58 is configured to accept user operations to operable members (e.g., icons and buttons) displayed on the LCD 56. The input I/F 58 may include hard keys, instead of or in addition to the touch panel.

The image scanner 60 is configured to perform image scanning to read an image. The image scanner 60 includes an image sensor such as a CCD image sensor or a contact image sensor. Thereby, the MFP 50 is enabled to perform a scanning process. The printer 62 includes, for instance, an inkjet head. The CPU 52 inputs a drive signal into the printer 62. Then, when the printer 62 includes the inkjet head, the CPU 52 controls the inkjet head to discharge ink from nozzles of the inkjet head in accordance with the input drive signal. Thus, the MFP 50 is enabled to perform a printing process.

The modem 64 is configured to modulate document data to be transmitted by a facsimile function into a signal transmittable to a telephone line network 78 and transmit the modulated signal via the telephone line connection I/F 66, and to receive a signal input from the telephone line network 78 via the telephone line connection I/F 66 and demodulate the received signal into document data. Thus, the MFP 50 is enabled to perform a facsimile process.

The communication I/F 68 is an interface for the MFP 50 to communicate with external devices via the communication path 80. Thus, the MFP 50 is enabled to communicate with the PC 10.

The EWS 70 has substantially the same functions as a web server. The EWS 70 stores therein information (hereinafter referred to as "EWS information") indicating HTML web pages related to information representing a status of the MFP 50 and setting information.

In the following description, processing by the CPUs 12 and 52 according to instructions described in programs will be basically shown. Namely, processes such as "judging," "extracting," "selecting," "calculating," "determining," "identifying," "obtaining," "accepting," "receiving," "controlling," and "setting" in the following description may represent processing by the CPU 12 or 52. The processing by the CPUs 12 and 52 may include hardware control via respective OSs therefor. It is noted that "obtaining" may be used as a concept that does not necessarily require a request. Namely, for instance, a process of the CPU 12 or 52 receiving data without making a request may be included in a concept of "the CPU 12 or 52 obtains data." Further, "data" in the following description may be represented by a computer-readable bit string. Additionally, a plurality of pieces of data having substantially the same meaning or content but expressed in different formats shall be treated as the same data. The same applies to "information" in the following description. Further, processes such as "instructing," "responding," and "requesting" may be performed by transmitting information representing "an instruction," "a response," and "a request," respectively. Further, the expressions such as "an instruction," "a response," and "a request," may be used to denote information itself that represents "the instruction," "the response," and "the request," respectively. Further, a process of a CPU determining whether or not the information A represents that it is the matter B may be conceptually described as "determining from the information A whether or not it is the matter B." Furthermore, a process of a CPU determining whether the information A represents that it is the matter B or the matter C may be conceptually described as "determining from the information A whether it is the matter B or the matter C."

Figure 2:
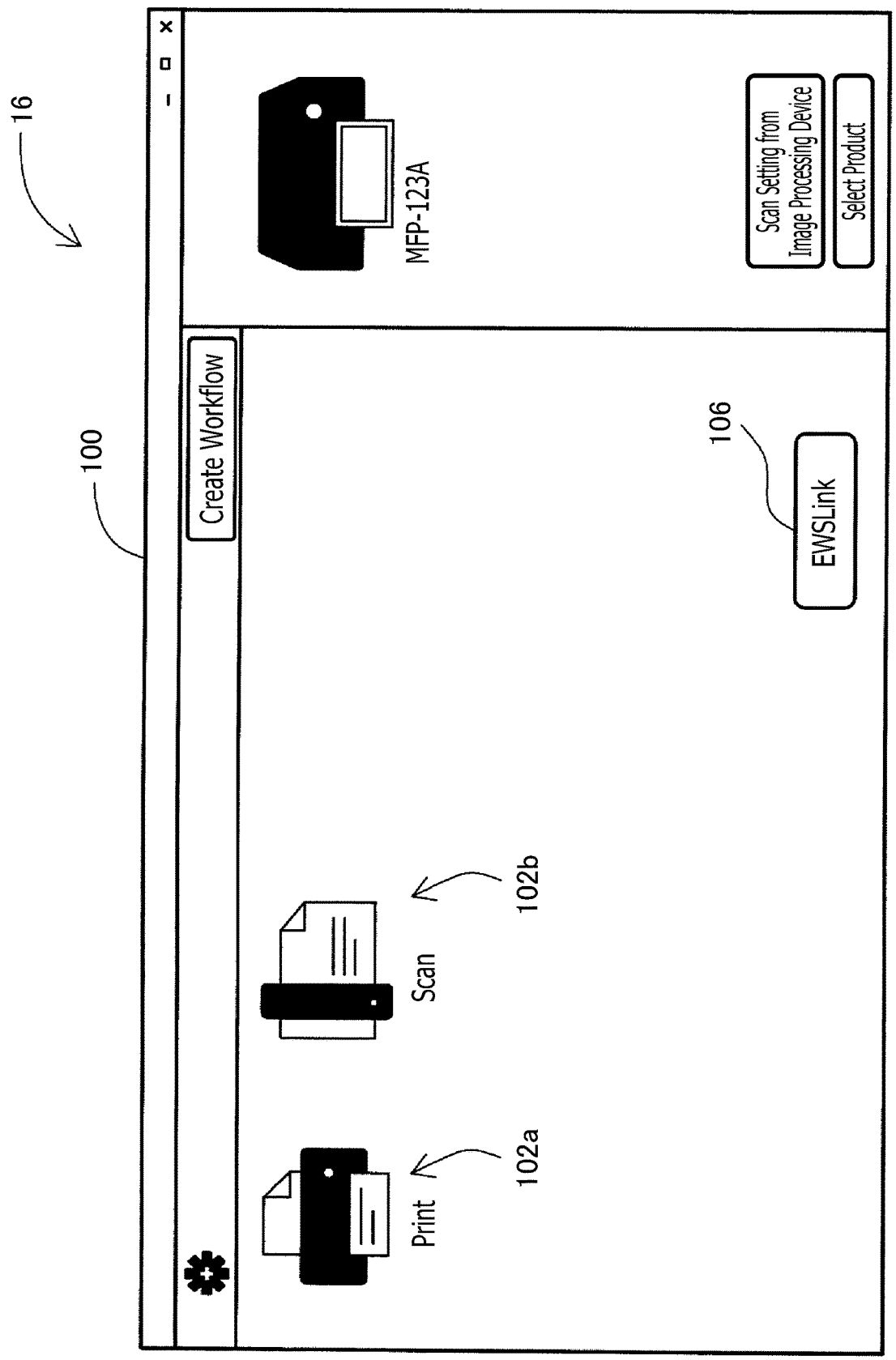
FIG. 2 shows an example of a home screen displayed on the PC, in the illustrative embodiment according to one or more aspects of the present disclosure.

In the communication system 1 configured as above, the MFP 50 performs various kinds of image processing such as a printing process, a scanning process, and a faxing process according to commands or instructions from the PC 10. Specifically, when the control program 30 is launched on the PC 10, a home screen 100 shown in FIG. 2 is displayed on the LCD 16. On the home screen 100, icons 102 corresponding to the image processing executable by the MFP 50 are displayed. For instance, an icon 102a for performing the printing process and an icon 102b for performing the scanning process are displayed on the home screen 100.

Figure 3:
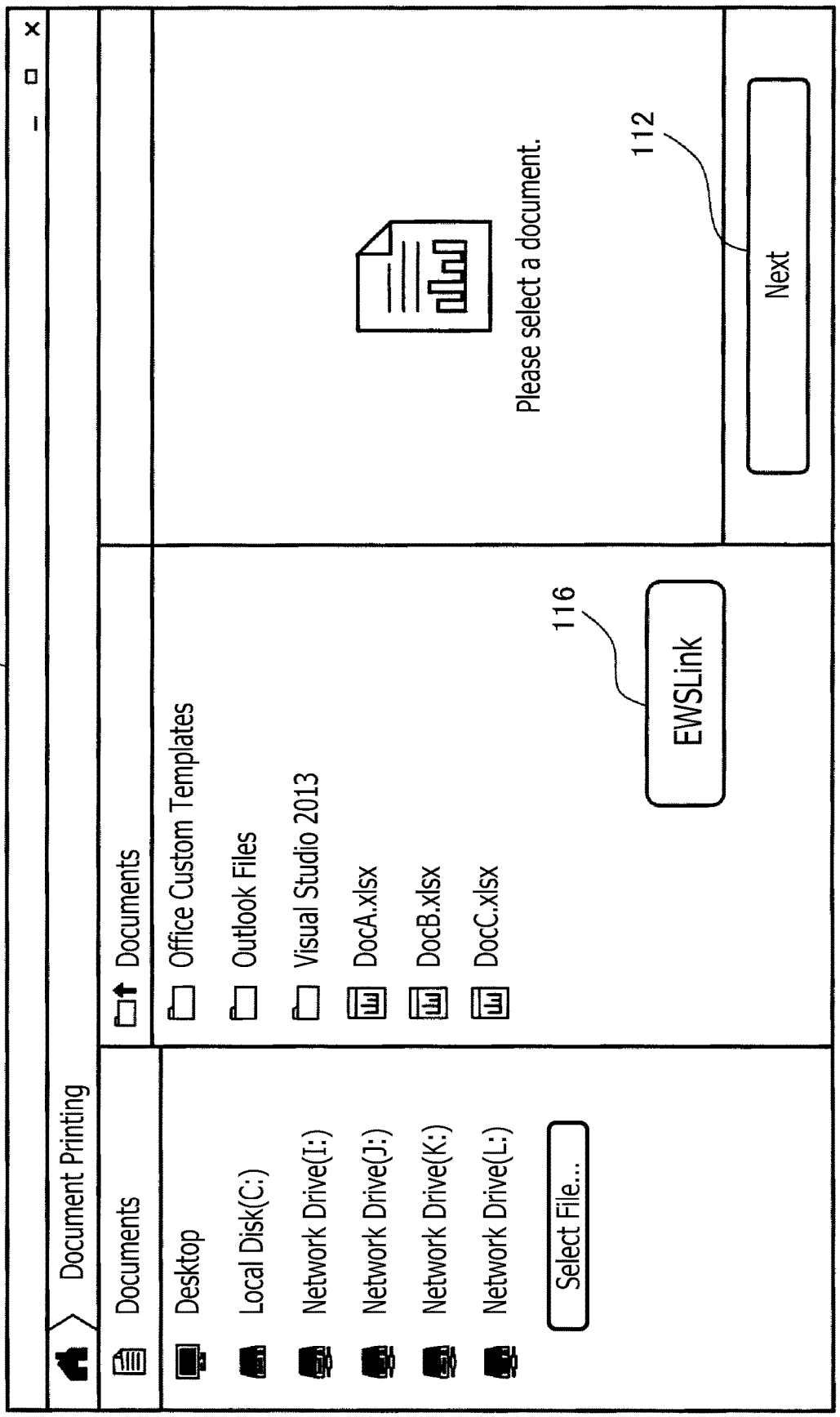
FIG. 3 shows an example of a print processing execution screen displayed on the PC, in the illustrative embodiment according to one or more aspects of the present disclosure.

For instance, when the icon 102a is operated on the home screen 100, a print processing execution screen 110 (see FIG. 3) is displayed on the LCD 16 instead of the home screen 100. On the print processing execution screen 110, respective file names of a plurality of files, in each of which image data is stored, are displayed. When one of the file names displayed on the print processing execution screen 110 is selected, and image data stored in the file of the selected file name is selected, the selected image data is determined as target image data to be printed. Then, when a print button 112 on the print processing execution screen 110 is operated, the printing process of printing an image based on the target image data is performed by the MFP 50.

Figure 4:
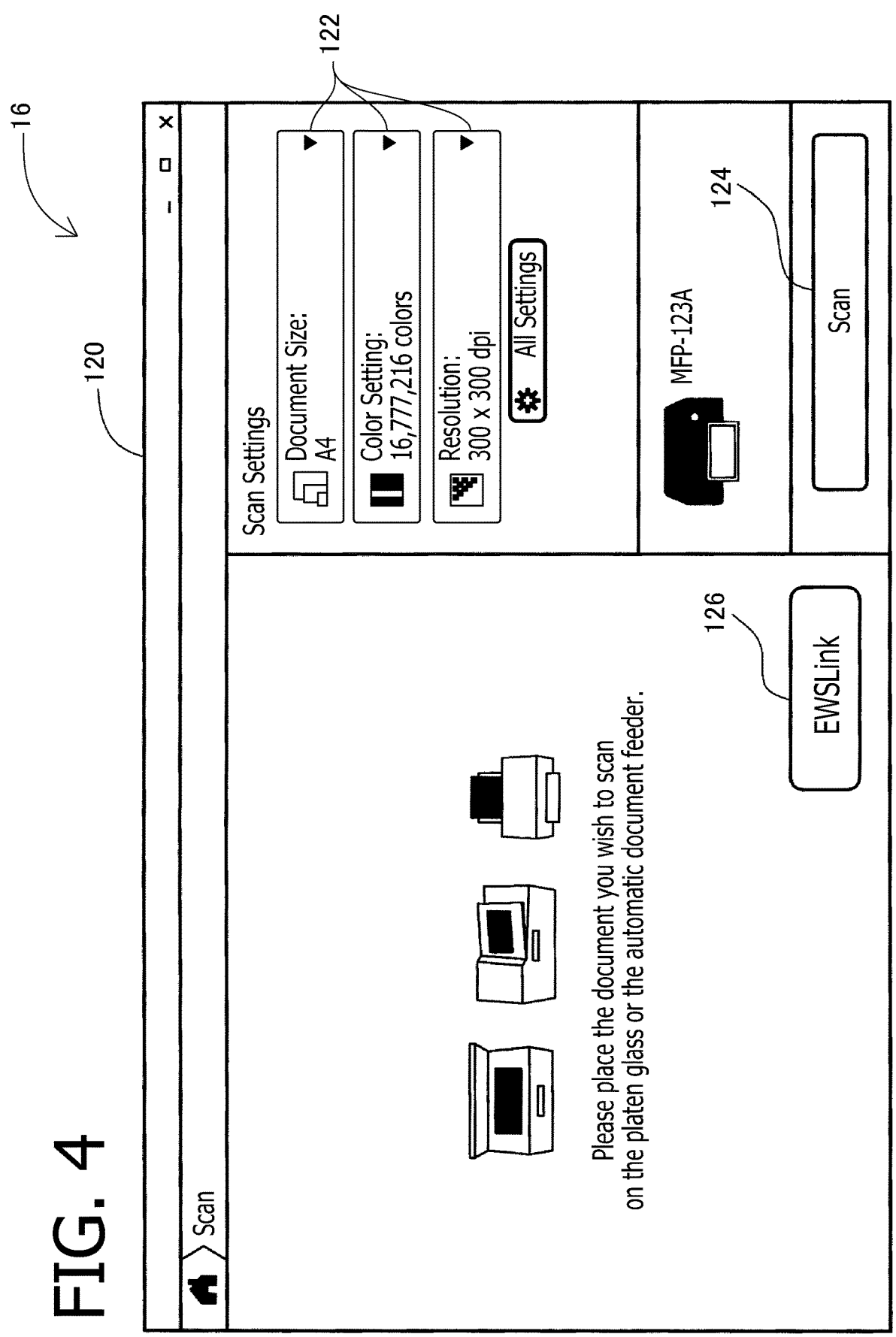
FIG. 4 shows an example of a scan processing execution screen displayed on the PC, in the illustrative embodiment according to one or more aspects of the present disclosure.

Further, for instance, when the icon 102b is operated on the home screen 100, a scan processing execution screen 120 (see FIG. 4) is displayed on the LCD 16 instead of the home screen 100. On the scan process execution screen 120, a plurality of setting buttons 122 for configuring settings for the scanning process are displayed. The settings for the scanning process are configured by operating the plurality of setting buttons 122. Then, when a scan button 124 on the scan processing execution screen 120 is operated, the scanning process of scanning a document set on the MFP 50 is performed.

Thus, the PC 50 displays on the LCD 16 various input screens such as the home screen 100, the print processing execution screen 110, and the scan processing execution screen 120. Further, the MFP 50 executes particular functions according to instructions input via those various input screens. Specifically, for instance, the MFP 50 executes a print processing function according to an instruction input via the print processing execution screen 110. Further, for instance, the MFP 50 executes a scan processing function according to an instruction input via the scan processing execution screen 120. Thus, the MFP 50 executes an image processing function such as the print processing function or the scan processing function according to the instruction input via the print processing execution screen 110 or the scan processing execution screen 120.

Further, for instance, the MFP 50 performs a basic function (e.g., a function for checking the status of the MFP 50) for executing image processing selected according to the instruction input via the home screen 100. Namely, according to the instruction input via the home screen 100, the MFP 50 executes a function (hereinafter referred to as a "non-image processing function") different from the image processing functions such as the print processing function and the scan processing function. Then, when receiving, via one of the various input screens, a request for information (hereinafter referred to as "EWS information") stored in the EWS 70, the PC 10 obtains, from the MFP 50, the EWS information corresponding to the said input screen, and displays a web page based on the obtained EWS information on the LCD 16. Specifically, for instance, when receiving a request for EWS information via the print processing execution screen 110, the PC 10 obtains the EWS information corresponding to the print processing function from the MFP 50, and displays on the LCD 16 a web page related to the print processing function based on the obtained EWS information. Further, for instance, when receiving a request for EWS information via the scan processing execution screen 120, the PC 10 obtains the EWS information corresponding to the scan processing function from the MFP 50, and displays on the LCD 16 a web page related to the scan processing function based on the obtained EWS information. Further, for instance, when receiving a request for EWS information via the home screen 100, the PC 10 obtains the EWS information corresponding to the non-image processing function from the MFP 50, and displays on the LCD 16 a web page related to the non-image processing function based on the obtained EWS information. Hereinafter, referring to FIGS. 11 to 13, explanations will be provided of processes to be performed by the PC 10 and the MFP 50 when the PC 10 obtains from the MFP 50 the EWS information corresponding to the various processing functions, and displays on the LCD 16 web pages related to the various processing functions based on the obtained EWS information.

Figure 11:
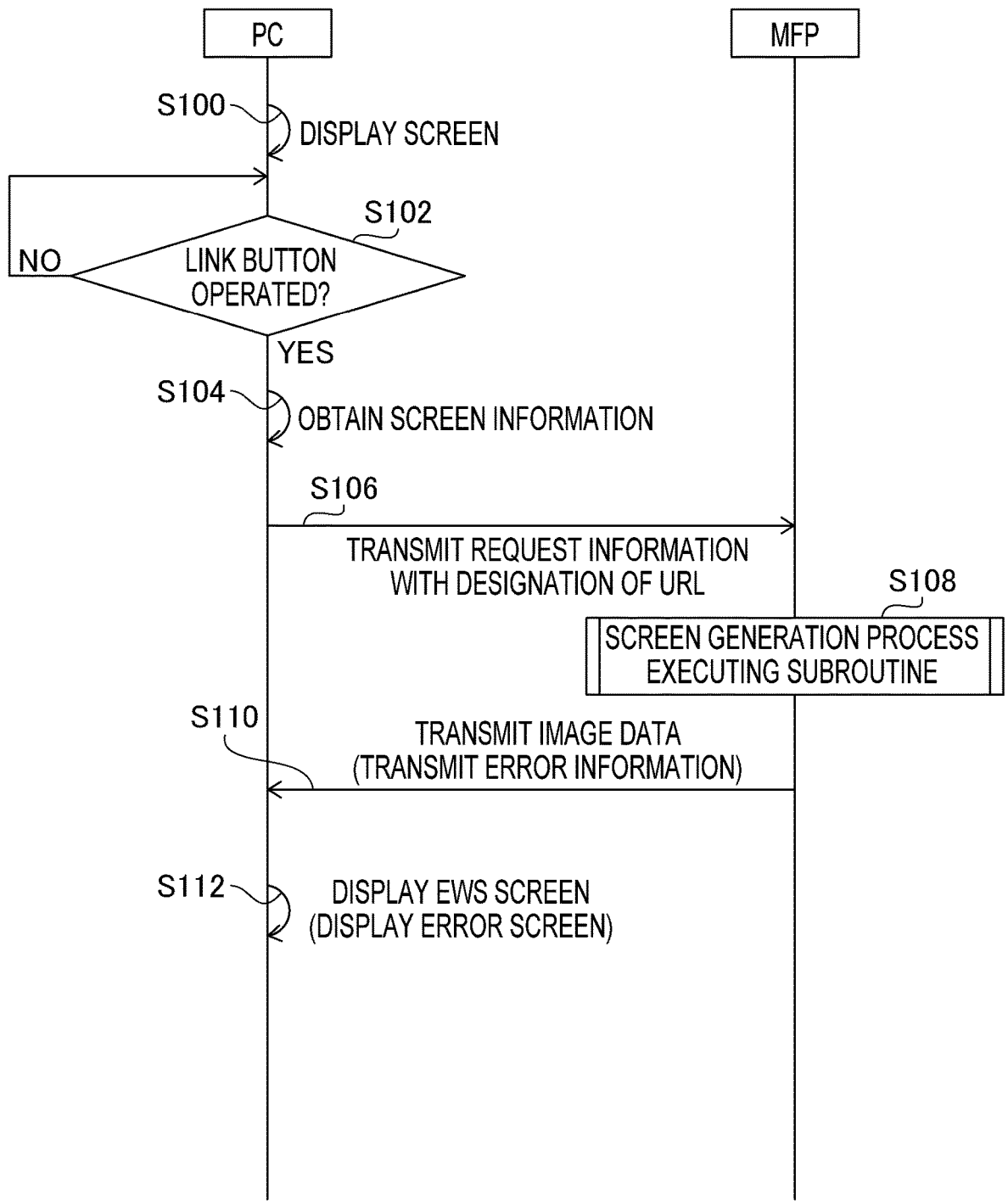
FIG. 11 is a sequence chart showing a sequence of processes to be performed by the PC and the MFP included in the communication system, in the illustrative embodiment according to one or more aspects of the present disclosure.

Specifically, in the PC 10, the control program 30 (more exactly, the CPU 12 executing the control program 30) displays on the LCD 16 one of the home screen 100, the print processing execution screen 110, and the scan processing execution screen 120 (S100 in FIG. 11). Link buttons 106, 116, and 126 each for making a request for the corresponding EWS information are displayed on the home screen 100, the print processing execution screen 110, and the scan processing execution screen 120, respectively. Then, the control program 30 determines whether one of the link buttons 106, 116, and 126 has been operated on the screen displayed on the LCD 16 (S102). At this time, the control program 30 waits until one of the link buttons 106, 116, 126 is operated (S102: No). Then, when determining that one of the link buttons 106, 116, and 126 has been operated (S102: Yes), the control program 30 obtains information (hereinafter referred to as "screen information") that represents a processing function corresponding to the screen on which the operated one of the link buttons 106, 116, and 126 is displayed (S104). Specifically, for instance, when the link button 106 has been operated on the home screen 100, the control program 30 obtains screen information that represents the processing function (i.e., the non-image processing function) corresponding to the home screen 100. Further, for instance, when the link button 116 has been operated on the print processing execution screen 110, the control program 30 obtains screen information that represents the processing function (i.e., the print processing function) corresponding to the print processing execution screen 110. Further, for instance, when the link button 126 has been operated on the scan processing execution screen 120, the control program 30 obtains screen information that represents the processing function (i.e., the scan processing function) corresponding to the scan processing execution screen 120.

Then, the control program 30 transmits, to the MFP 50, request information with designation of a URL corresponding to the processing function represented by the obtained screen information (S106). In the control program 30, URLs for the various processing functions are programmed, such as a URL (hereinafter referred to as a "non-image processing function URL") corresponding to the non-image processing function, a URL (hereinafter referred to as a "print processing function URL") corresponding to the print processing function, and a URL (hereinafter referred to as a "scan processing function URL") corresponding to the scan processing function. The control program 30 generates the URL corresponding to the processing function represented by the obtained screen information, by combining a corresponding one of the URLs for the various processing functions with a previously-obtained address of the MFP 50 on a network. Specifically, for instance, when the address of the MFP 50 on the network is "192.163.11.11," and the print processing function URL is "/print.html," the control program 30 generates "http://192.163.11.11/print.html." Then, the control program 30 transmits, to the MFP 50, the request information with designation of the generated URL corresponding to the processing function represented by the obtained screen information. The request information includes a user ID of a user who is operating the PC 10 and a password corresponding to the user ID.

Then, when receiving the request information from the PC 10, the MFP 50 performs a screen generation process executing subroutine (S108). In the screen generation process executing subroutine, the control program 74 (more exactly, the CPU 52 executing the control program 74) of the MFP 50 determines whether the user who has sent the request information has access permission (S200 in FIG. 12). Specifically, map data shown in FIG. 14 is stored in the data storage area 76 of the MFP 50. In the map data, each user ID is associated with a corresponding password. For instance, the map data (see FIG. 14) includes "User A" as a specific example of a user ID, and "Pass A" as a specific example of the corresponding password. When the combination of a user ID and a password included in the received request information matches the combination of a user ID and a password associated with each other in the map data, the control program 74 determines that the user has the access permission. Specifically, for instance, when the received request information includes the user ID "User A" and the password "Pass A," the control program 74 determines that the user has the access permission. Meanwhile, for instance, when the combination of a user ID and a password included in the received request information is different from the combination of the user ID "User A" and the password "Pass A," the control program 74 determines that the user does not have the access permission.

Then, when determining that the user has access permission (S200: Yes), the control program 74 determines whether the processing function corresponding to the URL (hereinafter referred to as the "designated URL") designated at the time of receiving the request information is a processing function executable by the user who is using the PC 10 (S202). Specifically, not all users are allowed to execute all of the plurality of functions executable by the MFP 50. One or more user-executable functions, among the plurality of functions executable by the MFP 50, are set for each individual user. Therefore, map data shown in FIG. 15 is stored in the data storage area 76 of the MFP 50. In the map data, each user ID is associated with functions (hereinafter, which may be referred to as "user-executable functions") executable by a user identified by each user ID.

As shown in FIG. 15, as specific examples of the user-executable functions, the non-image processing function is expressed as "General," the print processing function is expressed to as "Print," and the scan processing function is expressed as "Scan." Then, based on the map data (see FIG. 15), the control program 74 determines whether the processing function corresponding to the designated URL is a processing function executable by the user who is using the PC 10. Specifically, for instance, when the request information includes the user ID "User A," the user-executable functions are the "non-image processing function," the "print processing function," and the "scan processing function. In this case, when the processing function corresponding to the designated URL is the print processing function, the processing function corresponding to the designated URL is determined to be a processing function executable by the user who is using the PC 10. Further, for instance, when the request information includes the user ID "User B," the user-executable functions are the "non-image processing function" and the "print processing function. In this case, when the processing function corresponding to the designated URL is the scan processing function, the processing function corresponding to the designated URL is determined not to be a processing function executable by the user who is using the PC 10.

Then, when determining in S202 that the processing function corresponding to the designated URL is a processing function executable by the user who is using the PC 10 (S202: Yes), the control program 74 sets an EWS screen of the processing function corresponding to the designated URL as a main screen (S204). Specifically, for instance, when the designated URL is the non-image processing function URL, the control program 74 sets the EWS screen of the non-image processing function as the main screen. It is noted that, as described above, the non-image processing function is a basic processing function (e.g., a function for checking the status of the MFP 50). Further, as will be described in detail later, the EWS screen is a screen of a web page displayed based on the EWS information. Therefore, the EWS screen of the non-image processing function is a screen of a web page related to the basic processing function, and the screen of the web page related to the basic processing function is set as the main screen. Although the main screen will also be described in detail later, the main screen is a screen that is first displayed on the LCD 16 after one of the link buttons 106, 116, and 126 is operated on the PC 10. When the designated URL is the print processing function URL, the control program 74 sets the EWS screen of the print processing function (i.e., the screen of the web page related to the print processing function) as the main screen. Further, for instance, when the designated URL is the scan processing function URL, the control program 74 sets the EWS screen of the scan processing function (i.e., a screen of the web page related to the scan processing function) as the main screen.

When determining in S202 that the processing function corresponding to the designated URL is not a processing function executable by the user who is using the PC 10 (S202: No), the control program 74 sets, as the main screen, the EWS screen of not the processing function corresponding to the designated URL but the non-image processing function (S206).

Thus, when the EWS screen of one of the processing functions is set as the main screen in S204 or S206, the control program 74 determines whether there exists a processing function executable by the user who is using the PC 10 other than the processing function of the EWS screen set as the main screen (S208). Namely, the control program 74 determines whether there exists a function different from the processing function of the EWS screen set as the main screen among the user-executable functions associated with the user ID of the user who is using the PC 10 in the map data shown in FIG. 15. Specifically, for instance, when the request information includes the user ID "User A," and the processing function of the EWS screen set as the main screen is the non-image processing function, the control program 74 determines that the print processing function and the scan processing function exist as functions different from the non-image processing function among the user-executable functions. Further, for instance, when the request information includes the user ID "User B," and the processing function of the EWS screen set as the main screen is the print processing function, the control program 74 determines that the non-image processing function exists as a function different from the print processing function among the user-executable functions.

Then, when determining that there exists a function different from the processing function of the EWS screen set as the main screen among the user-executable functions associated with the user ID of the user who is using the PC 10 (S208: Yes), the control program 74 additionally sets the function(s) determined to exist, that is, the processing function(s) executable by the user who is using the PC 10 other than the processing function of the EWS screen set as the main screen, as processing functions of EWS screens (S210). Specifically, for instance, when the processing function of the EWS screen set as the main screen is the non-image processing function, and the print processing function and the scan processing function exist as user-executable functions other than the non-image processing function, the print processing function and the scan processing function are additionally set as processing functions of EWS screens. Therefore, the three processing functions, i.e., the non-image processing function, the print processing function, and the scan processing function are set as processing functions of EWS screens. Further, for instance, when the processing function of the EWS screen set as the main screen is the print processing function, and the non-image processing function exists as a user-executable function other than the print processing function, the non-image processing function is additionally set as a processing function of an EWS screen. Therefore, the two processing functions, i.e., the print processing function and the non-image processing function are set as the processing functions of the EWS screens.

Meanwhile, when determining in S208 that there exists no function different from the processing function of the EWS screen set as the main screen among the user-executable functions associated with the user ID of the user who is using the PC 10 (S208: No), the control program 74 skips S210. Namely, in this case, no function other than the processing function of the EWS screen set as the main screen is additionally set as a processing function of an EWS screen.

Figure 13:
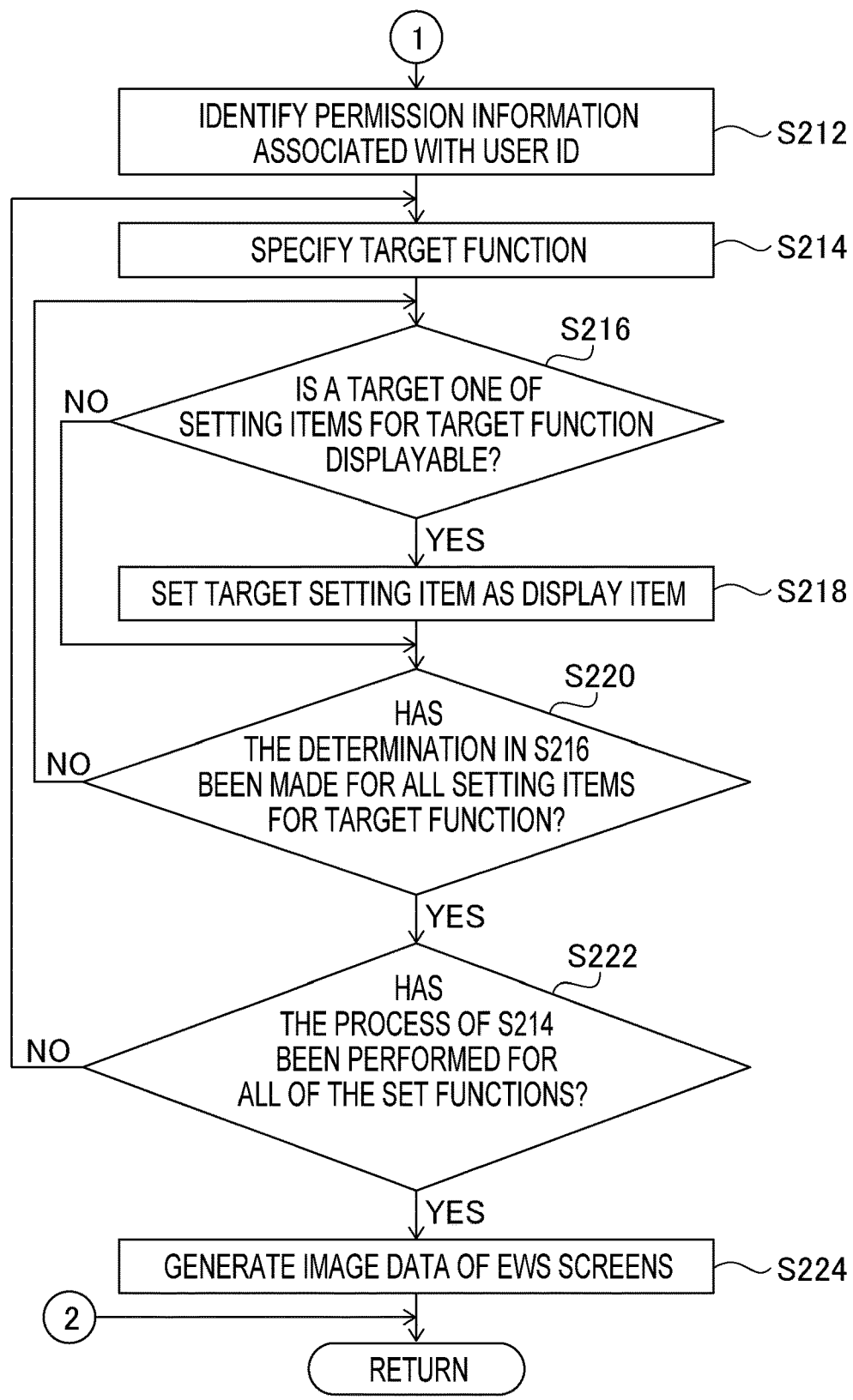

Thus, when one or more processing functions are set as the processing functions of the EWS screens, the control program 74 identifies permission information associated with the user ID of the user who is using the PC 10 (S212 in FIG. 13). Specifically, display permission, representing whether the EWS screens based on the EWS information are authorized to be displayed on the PC 10, is set for each user, and information representing the display permission is stored as the permission information in the data storage area 76 of the MFP 50. Each permission information is stored in association with a corresponding one of the user IDs, in map data shown in FIG. 16. Therefore, the control program 74 identifies permission information associated with the user ID of the user who is using the PC 10, based on the map data. Specifically, for instance, when the request information includes the user ID "User A," the control program 74 identifies permission information "Administrator" associated with the user ID. Further, for instance, when the request information includes the user ID "User B," the control program 74 identifies permission information "General" associated with the user ID.

The permission information "Administrator" represents display permission to authorize all items of the EWS screens to be displayed on the PC 10. The permission information "General" represents display permission to authorize fewer items of the EWS screens than the permission information "Administrator" to be displayed on the PC 10. Information regarding each processing function displayed on a corresponding EWS screen includes a plurality of setting items. The permission information represents display permission for each of the plurality of setting items. Specifically, as shown in FIG. 17, the print processing function has a plurality of setting items such as "Print," "Tray," "Duplex Printing," and "Print Color." In addition, the scan processing function has a plurality of setting items such as "Scan to USB," "FTP/Network File Scan," and "FTP/Network File Scan Profile." Further, the non-image processing function has a plurality of setting items such as "Status" and "Reload Interval." Furthermore, each of the setting items (hereinafter referred to as the "major items") for each processing function is subdivided into a plurality of setting items (hereinafter referred to as the "minor items"). Specifically, for instance, a major item of "Print" for the print processing function includes a plurality of minor items of "Toner Saving" and "Error Cancellation." Further, for instance, a major item of "Scan to USB" for the scan processing function includes a plurality of minor items such as "Resolution" and "File Format." Nonetheless, it is noted that each processing function may have one or more major items with no minor items (i.e., one or more major items each of which is not subdivided into a plurality of minor items). With respect to each of the setting items (including the major items with no minor items, and the minor items included in the other major items) for each of the various processing functions, the display permission ("TRUE" or "FALSE") is set for each permission information such as "Administrator" or "General." In FIG. 17, "TRUE" represents that the display permission is given, and "FALSE" represents that the display permission is not given. Namely, as shown in FIG. 17, the permission information "Administrator" has the display permission for all of the setting items (including the major items with no minor items, and the minor items included in the other major items) for the various processing functions. Meanwhile, the permission information "General" has the display permission for some, but not all, of the setting items (including the major items with no minor items, and the minor items included in the other major items) for the various processing functions. As a result, with respect to the permission information "Administrator," all the items of the EWS screens are authorized to be displayed on the PC 10. Further, with respect to the permission information "General," fewer items of the EWS screens than the permission information "Administrator" are authorized to be displayed on the PC 10. The information shown in FIG. 17 is stored as map data in the data storage area 76 of the MFP 50. In the above description, as the various processing functions executable by the MFP 50, the non-image processing function, the print processing function, and the scan processing function have been described. However, other processing functions such as an administrator setting processing function and a network processing function are also executable by the MFP 50. In the map data, the display permission is set for each permission information with respect to each of the said other processing functions as well.

Then, based on the map data shown in FIG. 17, the control program 74 determines whether the display permission is given to each of the setting items (including the major items with no minor items, and the minor items included in the other major items) for each of the one or more functions set as the processing functions of the EWS screens. As described above, one or more processing functions are set as the processing functions of the EWS screens. Hence, the control program 74 specifies one arbitrary processing function to be judged (hereinafter referred to as the "target function") from among the one or more processing functions set as the processing functions of the EWS screens (S214). Specifically, for instance, when the two processing functions, i.e., the print processing function and the non-image processing function are set as the processing functions of the EWS screens, the control program 74 specifies one (e.g., the print processing function) of the two processing functions.

Next, the control program 74 determines whether a target one of the setting items (including the major items with no minor items, and the minor items included in the other major items) for the target function is a displayable item which is authorized to be displayed on the PC 10, based on the map data shown in FIG. 17 (S216). Then, when determining that the target setting item is a displayable item (S216: Yes), the control program 74 sets the target setting item as a display item (S218). Meanwhile, when determining that the target setting item is not a displayable item (S216: No), the control program 74 skips S218. In this case, the target setting item is not set as a display item.

Specifically, for instance, when the permission information is "Administrator," and the target function is the print processing function, the control program 74 determines whether the major item "Color Correction" for the print processing function is a displayable item. In this case, the display permission for the major item "Color Correction" is set to "TRUE" for the permission information "Administrator" in the map data shown in FIG. 17. Therefore, the major item "Color Correction" for the print processing function is set as a display item. On the other hand, for instance, when the permission information is "General," the display permission for the major item "Color Correction" is set to "FALSE" in the map data shown in FIG. 17. Therefore, the major item "Color Correction" for the print processing function is not set as a display item.

Then, the control program 74 determines whether the determination in S216 has been made for all of the setting items (including the major items with no minor items, and the minor items included in the other major items) for the target function (S220). When determining that the determination in S216 has been made for not all of the setting items for the target function (S220: No), the control program 74 goes back to S216, and executes S216 and the following steps. Namely, the control program 74 determines whether the display permission is given or not to (i.e., the display permission is set to "TRUE" or "FALSE" for) each of all the setting items (including the major items with no minor items, and the minor items included in the other major items) for the target function. Then, setting items to which the display permission is given (i.e., setting items for which the display permission is set to "TRUE") are set as display items.

When determining that the determination in S216 has been made for all of the setting items for the target function (S220: Yes), the control program 74 determines whether the process of S214 has been performed for all of the functions set as the processing functions of the EWS screens (S222). When determining that the process of S214 has been performed for not all of the functions set as the processing functions of the EWS screens (S222: No), the control program 74 goes back to S214, and executes S214 and the following steps. Namely, the control program 74 specifies, as the target functions, all of the functions set as the processing functions of the EWS screens, and executes S216 and the following steps for the identified target functions. Thus, for instance, when the two processing functions, i.e., the print processing function and the non-image processing function are set as the processing functions of the EWS screens, the control program 74 performs the processes of S214 to S220 for each of the two processing functions.

When determining that the process of S214 has been performed for all of the functions set as the processing functions of the EWS screens (S222: Yes), the control program 74 generates image data of the EWS screens based on the EWS information stored in the EWS 70 (S224). At this time, the control program 74 generates the image data of the EWS screens in such a manner that the display items set in S218 are displayed for each processing function. Specifically, for instance, when the print processing function is set as one of the processing functions of the EWS screens, the control program 74 generates image data in such a manner that the display items set for the print processing function are displayed as a single EWS screen. Further, in this case, the control program 74 generates the image data in such a manner that a single tab is attached to the single EWS screen. Then, the control program 74 generates image data representing a state where a tab attached to the EWS screen set as the main screen in S204 or S206 is selected. Thus, for instance, in generating image data of a plurality of EWS screens, the control program 74 generates the image data representing a state in which a tab attached to the EWS screen set as the main screen is selected among a plurality of tabs respectively attached to the plurality of EWS screens, and the EWS screen set as the main screen is displayed in front of the other EWS screen(s). Then, after completion of generating the image data of the EWS screens, the control program 74 terminates the screen generation process executing subroutine, and transmits the generated image data to the PC 10 (S110 in FIG. 11). Thereafter, in the PC 10, the control program 30 activates the browser 32, and the browser 32 causes the LCD 16 to display the EWS screens based on the image data (S112).

Figure 5:
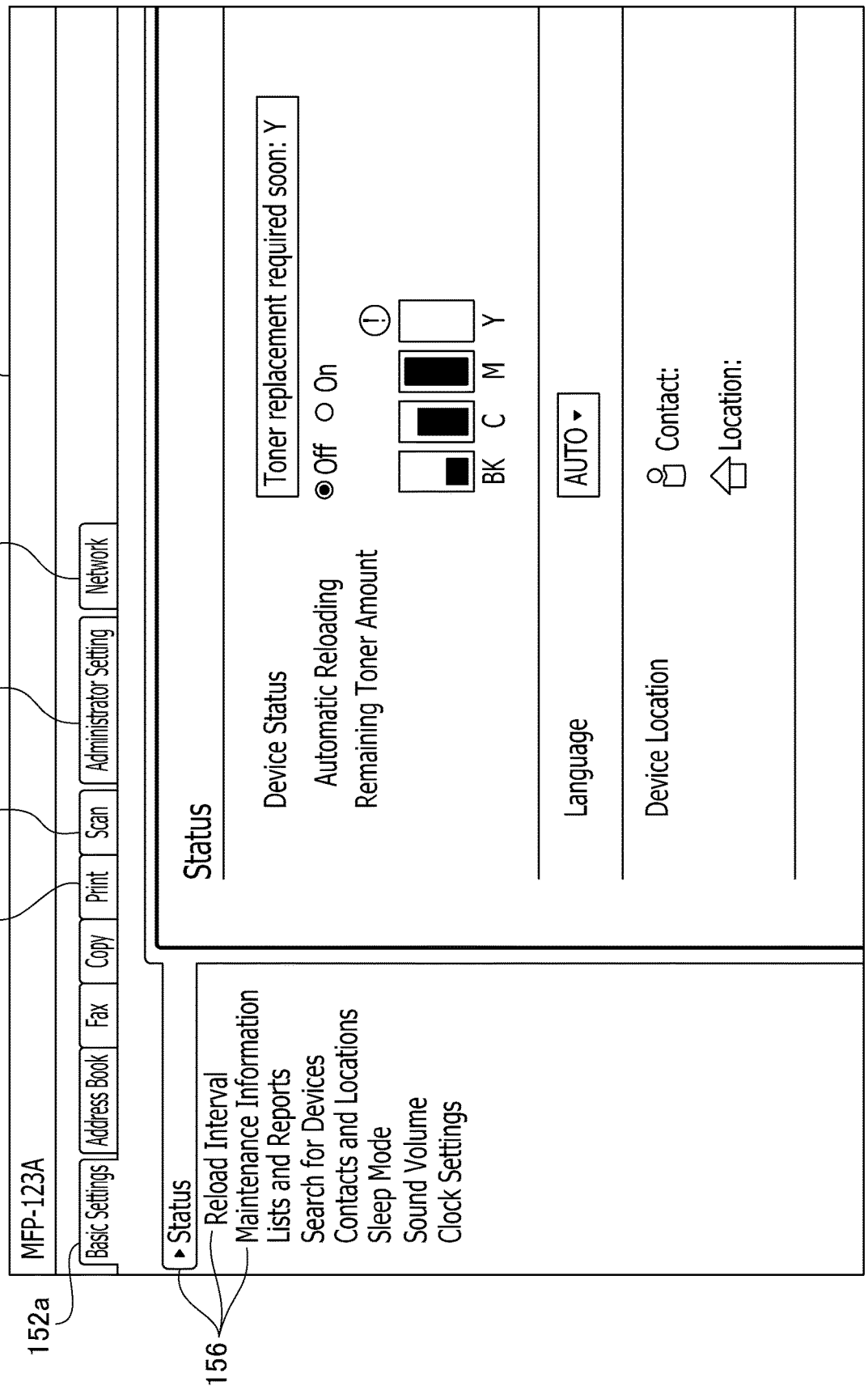
FIG. 5 shows an example of a non-image processing EWS screen, displayed on the PC, on which all setting items for a non-image processing function are displayed, in the illustrative embodiment according to one or more aspects of the present disclosure.

Specifically, for instance, when the user identified by the user ID "User A" operates the link button 106 on the home screen 100, since the non-image processing function corresponding to the home screen 100 is included in the user-executable functions associated with the user ID "User A" (see FIG. 15), the EWS screen of the non-image processing function is set as the main screen (S204). Further, the user-executable functions associated with the user ID "User A" include the "print processing function" and the "scan processing function" (see FIG. 15). Therefore, the "print processing function" and the "scan processing function" are additionally set as processing functions of EWS screens. In other words, the non-image processing function, the print processing function, and the scan processing function are set as the processing functions of the EWS screens. Further, in the map data shown in FIG. 16, the permission information "Administrator" is stored in association with the user ID "User A." Furthermore, in the map data shown in FIG. 17, the display permission is set to "TRUE" for all the setting items for all the processing functions with respect to the permission information "Administrator." Therefore, in the MFP 50, the image data is generated such as the image data of the EWS screen (hereinafter referred to as the "non-image processing EWS screen") corresponding to the non-image processing function, the image data of the EWS screen (hereinafter referred to as the "print processing EWS screen") corresponding to the print processing function, the image data of the EWS screen (hereinafter referred to as the "scan processing EWS screen") corresponding to the scan processing function, the image data of the EWS screen (hereinafter referred to as the "administrator setting processing EWS screen") corresponding to the administrator setting processing function, and the image data of the EWS screen (hereinafter referred to as the "network processing EWS screen") corresponding to the network processing function. At this time, the image data is generated in such a manner that each of those EWS screens includes all of the setting items for the corresponding processing function of each EWS screen. Specifically, for instance, the image data is generated in such a manner that the non-image processing EWS screen includes all of the setting items for the non-image processing function. In addition, the image data is generated in such a manner that the plurality of EWS screens have respective tabs attached thereto. Specifically, for instance, the image data is generated in such a manner that a non-image processing tab is attached to the non-image processing EWS screen, a print processing tab is attached to the print processing EWS screen, a scan processing tab is attached to the scan processing EWS screen, an administrator setting processing tab is attached to the administrator setting processing EWS screen, and a network processing tab is attached to the network processing EWS screen. Further, the image data is generated in such a manner that the non-image processing EWS screen is displayed with the non-image processing tab, which is attached to the non-image processing EWS screen set as the main screen, being selected among the plurality of tabs. When the image data generated as described above is transmitted to the PC 10, a non-image processing EWS screen 150 is displayed on the LCD 16, as shown in FIG. 5. On the non-image processing EWS screen 150, a plurality of tabs are displayed such as a non-image processing tab 152*a*, a print processing tab 152*b*, a scan processing tab 152*c*, an administrator processing tab 152*d*, and a network processing tab 152*e*. Further, on the non-image processing EWS screen 150, the non-image processing tab 152*a* is selected. Further, on the non-image processing EWS screen 150, all of the setting items (i.e., setting items 156 such as "Status," "Reload Interval," and "Maintenance Information") for the non-image processing function are displayed. Furthermore, on the non-image processing EWS screen 150, information on a setting item selected from among all the setting items 156 is displayed.

Figure 6:
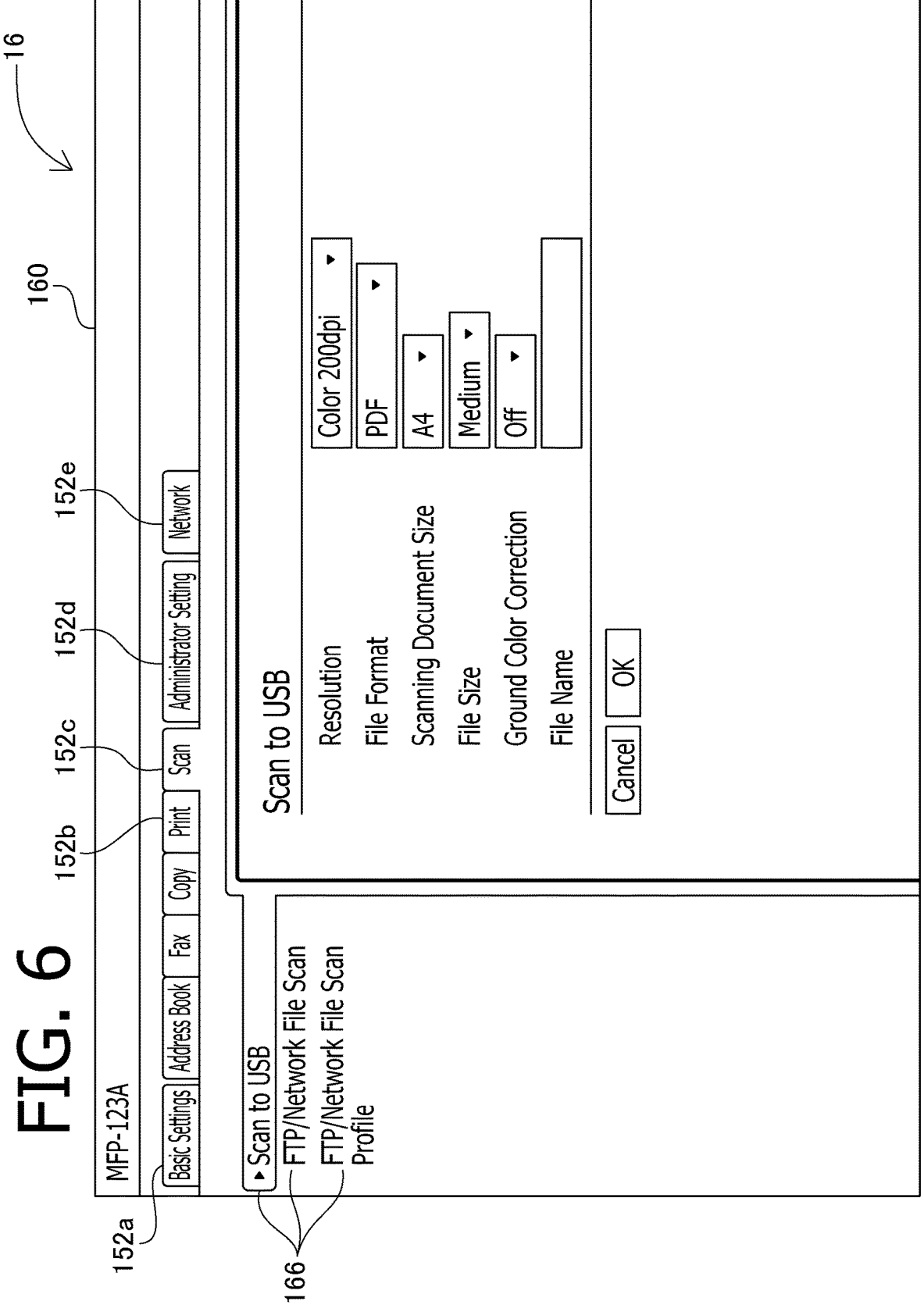
FIG. 6 shows an example of a scan processing EWS screen displayed on the PC, in the illustrative embodiment according to one or more aspects of the present disclosure.

Further, for instance, when the user identified by the user ID "User A" operates the link button 126 on the scan processing execution screen 120, the EWS screen of the scan processing function is set as the main screen based on the map data shown in FIG. 15 (S204). Further, in substantially the same manner as described above, the non-image processing function, the print processing function, and the scan processing function are set as the processing functions of the EWS screen based on the map data shown in FIG. 15. Further, in substantially the same manner as described above, based on the map data shown in FIGS. 16 and 17, the image data is generated such as the image data of the non-image processing EWS screen with the non-image processing tab, the image data of the print processing EWS screen with the print processing tab, and the image data of the scan processing EWS screen with the scan processing tab. At this time, the image data is generated in such a manner that each of all the EWS screens includes all of the setting items for the corresponding processing function of each EWS screen. Further, the image data is generated in such a manner that the scan processing EWS screen is displayed with the scan processing tab, which is attached to the scan processing EWS screen set as the main screen, being selected from among the plurality of tabs. When the image data generated as described above is transmitted to the PC 10, a scan processing EWS screen 160 is displayed on the LCD 16, as shown in FIG. 6. On the scan processing EWS screen 160, a plurality of tabs are displayed such as the non-image processing tab 152*a*, the print processing tab 152*b*, the scan processing tab 152*c*, the administrator processing tab 152*d*, and the network processing tab 152*e*. Further, on the scan processing EWS screen 160, the scan processing tab 152*c* is selected. Further, on the scan processing EWS screen 160, all of the setting items (i.e., setting items 166 such as "Scan to USB," "FTP/Network File Scan," and "FTP/Network File Scan Profile") for the scan processing function are displayed. Furthermore, on the scan processing EWS screen 160, information on a setting item selected from among all the setting items 166 is displayed.

Figure 7:
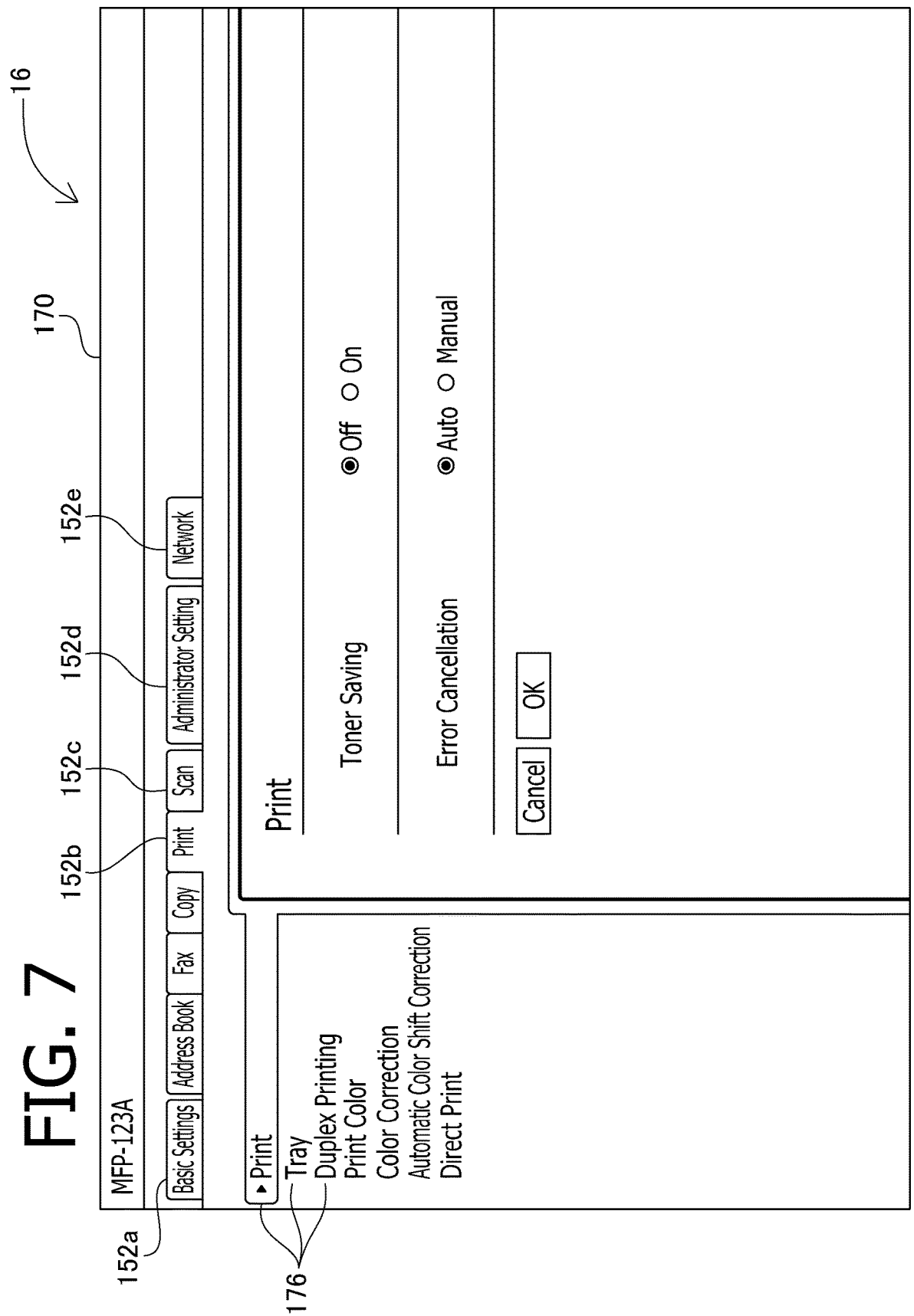
FIG. 7 shows an example of a print processing EWS, displayed on the PC, on which all setting items for a print processing function are displayed with a setting item "Print" selected, in the illustrative embodiment according to one or more aspects of the present disclosure.

Further, for instance, when the user identified by the user ID "User A" operates the link button 116 on the print processing execution screen 110, the EWS screen of the print processing function is set as the main screen based on the map data shown in FIG. 15 (S204). Further, in substantially the same manner as described above, the non-image processing function, the print processing function, and the scan processing function are set as the processing functions of the EWS screen based on the map data shown in FIG. 15. Further, in substantially the same manner as described above, based on the map data shown in FIGS. 16 and 17, the image data is generated such as the image data of the non-image processing EWS screen with the non-image processing tab, the image data of the print processing EWS screen with the print processing tab, and the image data of the scan processing EWS screen with the scan processing tab. At this time, the image data is generated in such a manner that each of all the EWS screens includes all of the setting items for the corresponding processing function of each EWS screen. Further, the image data is generated in such a manner that the print processing EWS screen is displayed with the print processing tab, which is attached to the print processing EWS screen set as the main screen, being selected from among the plurality of tabs. When the image data generated as described above is transmitted to the PC 10, a print processing EWS screen 170 is displayed on the LCD 16, as shown in FIG. 7. On the print processing EWS screen 170, a plurality of tabs are displayed such as the non-image processing tab 152*a*, the print processing tab 152*b*, the scan processing tab 152*c*, the administrator processing tab 152*d*, and the network processing tab 152*e*. Further, on the scan processing EWS screen 160, the print processing tab 152*b* is selected. Further, on the print processing EWS screen 170, all of the setting items (i.e., setting items 176 such as "Print," "Tray," and "Duplex Printing") for the print processing function are displayed. Furthermore, on the print processing EWS screen 170, information on a setting item selected from among all the setting items 176 is displayed. Specifically, for instance, when the setting item "Print" is selected as shown in FIG. 7, information on the setting item "Print" is displayed on the print processing EWS screen 170.

As described above, when a corresponding one of the link buttons 106, 116, and 126 is operated on a screen (e.g., the home screen 100, the print processing execution screen 110, or the scan processing execution screen 120) displayed on the LCD 16, information on the said screen is displayed as an EWS screen. Thus, the user is allowed to view the user's desired information by simply operating the link button on the displayed screen.

Figure 8:
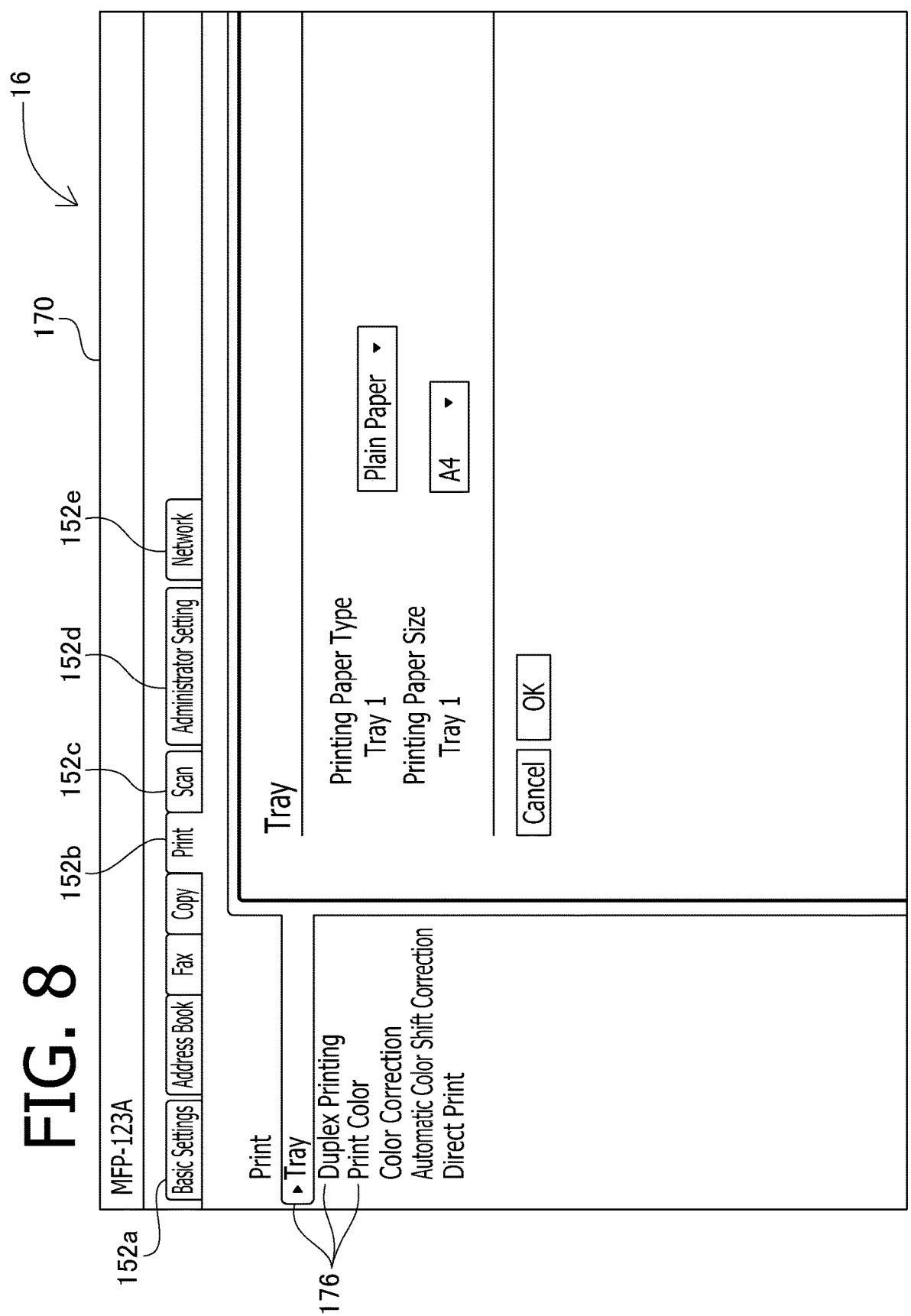
FIG. 8 shows an example of the print processing EWS screen with a setting item "Tray" selected, in the illustrative embodiment according to one or more aspects of the present disclosure.

When another setting item 176 is selected on the print processing EWS screen 170, for instance, when the setting item "Tray" (which is different from the setting item "Print" selected in FIG. 7) is selected as shown in FIG. 8, information on the setting item "Tray" is displayed on the print processing EWS screen 170. Thus, the user is allowed to view the information on the user's desired setting item.

Further, for instance, when the non-image processing tab 152a is selected on the print processing EWS screen 170, the non-image processing EWS screen 150 is displayed on the LCD 16 instead of the print processing EWS screen 170, as shown in FIG. 5. Thereby, the user is allowed to view information on processing functions different from the processing function initially displayed.

Figure 9:
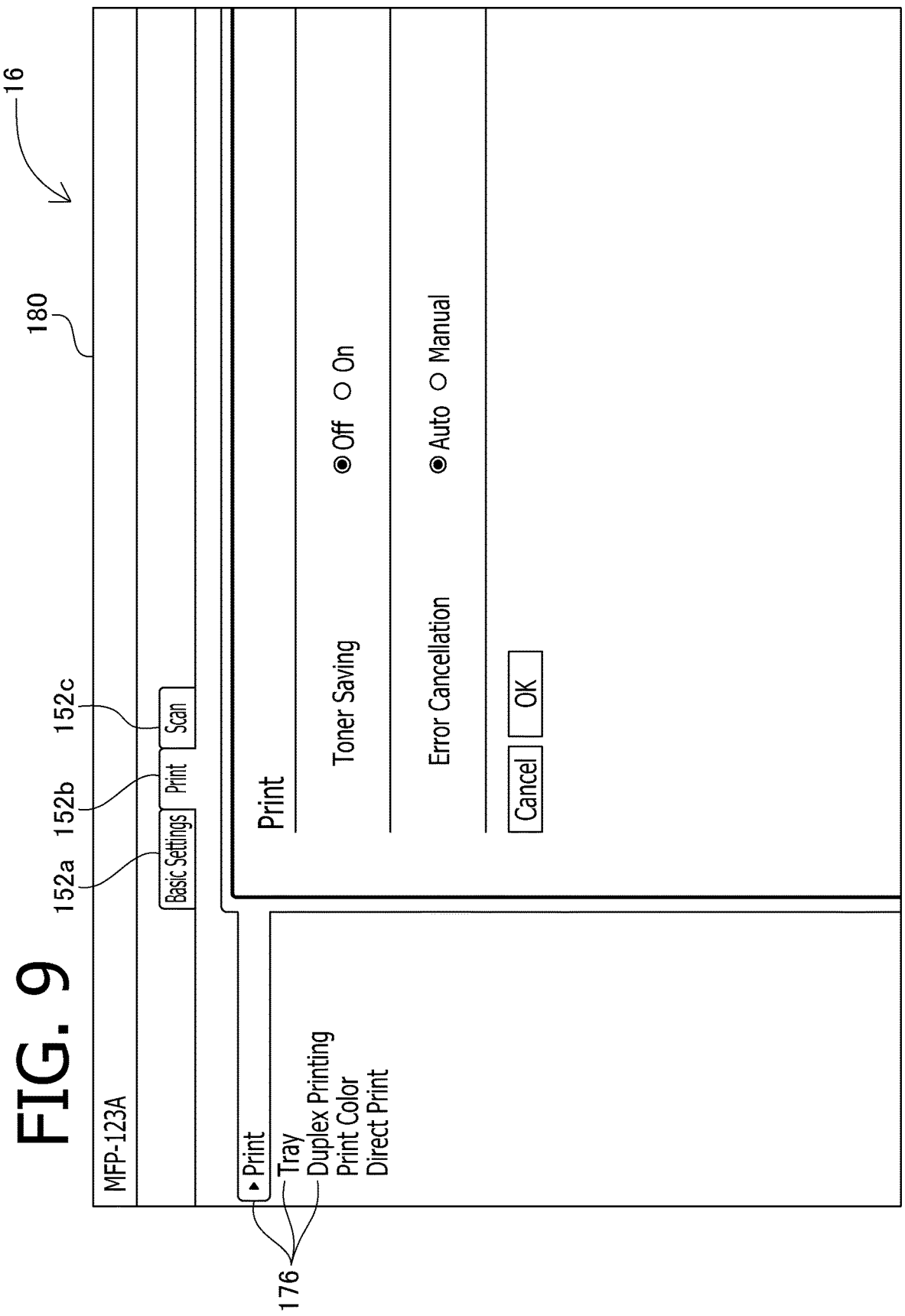
FIG. 9 shows an example of a print processing EWS screen on which some of the setting items for the print processing function are displayed with the setting item "Print" selected, in the illustrative embodiment according to one or more aspects of the present disclosure.

Further, for instance, when the user identified by the user ID "User C" operates the link button 116 on the print processing execution screen 110, since the print processing function corresponding to the print processing execution screen 110 is included in the user-executable functions associated with the user ID "User C" (see FIG. 15), the EWS screen of the print processing function is set as the main screen (S204). Further, the user-executable functions associated with the user ID "User C" include the "non-image processing function" and the "scan processing function" (see FIG. 15). Therefore, the "non-image processing functions" and the "scan processing functions" are additionally set as processing functions of EWS screens. Namely, the non-image processing function, the print processing function, and the scan processing function are set as the processing functions of the EWS screens. Further, in the map data shown in FIG. 16, the permission information "General" is stored in association with the user ID "User C." In the map data shown in FIG. 17, with respect to the permission information "General," the display permission is set to "TRUE" only for some, but not all, of the setting items for some, but not all, of the processing functions. Therefore, in the MFP 50, image data of EWS screens corresponding to processing functions having setting items for which the display permission is set to "TRUE," among the processing functions set as the processing functions of the EWS screens, is generated. Specifically, the image data of the non-image processing EWS screen, the image data of the print processing EWS screen, and the image data of the scan processing EWS screen are generated. At this time, the image data is generated in such a manner that each of the above EWS screens includes only the setting items for which the display permission is set to "TRUE" among all the setting items for the corresponding processing function of each EWS screen. Specifically, for instance, with respect to the print processing EWS screen, the image data thereof is generated in such a manner that the print processing EWS screen includes setting items such as "Toner Saving" and "Error Cancellation" but does not include setting items of "Color Correction" and "Automatic Color Shift Correction." At this time, the image data is generated in such a manner that a tab is attached to each of the above EWS screens, i.e., the non-image processing EWS screen, the print processing EWS screen, and the scan processing EWS screen. Further, the image data is generated in such manner that the print processing EWS screen is displayed with the tab (i.e., the print processing tab) of the EWS screen set as the main screen being selected from among the tabs respectively attached to the above EWS screens. When the image data generated as above is transmitted to the PC 10, a print processing EWS screen 180 is displayed on the LCD 16, as shown in FIG. 9. The print processing EWS screen 180 displays thereon the non-image processing tab 152a, the print processing tab 152b, and the scan processing tab 152c. Meanwhile, the print processing EWS screen 180 does not display the administrator processing tab 152d or the network processing tab 152e. Further, the print processing tab 152b is selected on the print processing EWS screen 180. Further, among all the setting items for the print processing function, the print processing EWS screen 180 displays thereon setting items 176 such as "Print," "Tray," and "Duplex Printing," but does not display "Color Correction" or "Automatic Color Shift Correction." Further, information regarding the setting item selected from among the displayed setting items 176 is displayed on the print processing EWS screen 180. Thus, the user is allowed to view, as EWS screens, only the limited processing functions and the limited setting items according to the permission information. Namely, display contents of the EWS screens may be adjusted as desired for each user.

Figure 10:
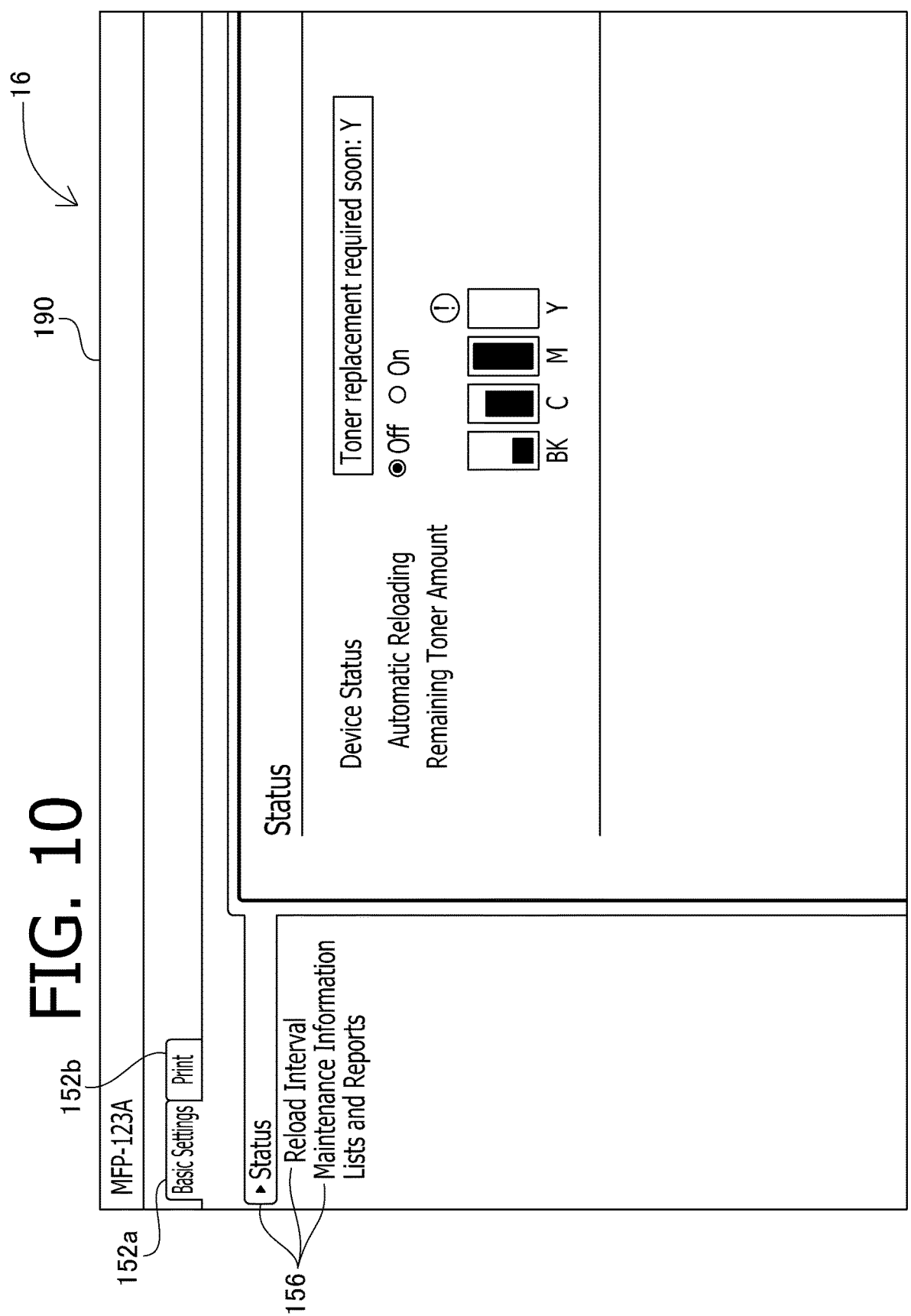
FIG. 10 shows an example of a non-image processing EWS screen on which some of the setting items for the non-image processing function are displayed, in the illustrative embodiment according to one or more aspects of the present disclosure.

Further, for instance, when the user identified by the user ID "User B" operates the link button 126 in the scan processing execution screen 120, since the scan processing function corresponding to the scan processing execution screen 120 is not included in the user-executable functions associated with the user ID "User B" (see FIG. 15), the EWS screen of the non-image processing function is set as the main screen (S206). Further, the user-executable functions associated with the user ID "User B" include the "print processing function" (see FIG. 15). Therefore, the "print processing function" is additionally set as a processing function of the EWS screen. Namely, the non-image processing function and the print processing function are set as the processing functions of the EWS screens. Further, in the map data shown in FIG. 16, the permission information "General" is stored in association with the user ID "User B." Further, in the map data shown in FIG. 17, with respect to the permission information "General," the display permission is set to "TRUE" only for some, but not all, of the setting items for some, but not all, of the processing functions. Therefore, in the MFP 50, image data of EWS screens corresponding to processing functions having setting items for which the display permission is set to "TRUE," among the processing functions set as the processing functions of the EWS screens, is generated. Specifically, the image data of the non-image processing EWS screen and the image data of the print processing EWS screen are generated. At this time, the image data is generated in such a manner that each of the above EWS screens includes only the setting items for which the display permission is set to "TRUE" among all the setting items for the corresponding processing function of each EWS screen. Specifically, for instance, with respect to the non-image processing EWS screen, the image data thereof is generated in such a manner that the non-image processing EWS screen includes setting items such as "Device Status," "Remaining Toner Amount," and "Reload Interval" but does not include setting items such as "Language" and "Device Location." At this time, the image data is generated in such a manner that a tab is attached to each of the above EWS screens, i.e., the non-image processing EWS screen and the print processing EWS. Further, the image data is generated in such manner that the non-image processing EWS screen is displayed with the tab (i.e., the non-image processing tab) of the EWS screen set as the main screen being selected from among the tabs respectively attached to the above EWS screens. When the image data generated as above is transmitted to the PC 10, a non-image processing EWS screen 190 is displayed on the LCD 16, as shown in FIG. 10. The non-image processing EWS screen 190 displays thereon the non-image processing tab 152a and the print processing tab 152b. Meanwhile, the non-image processing EWS screen 190 does not display the scan processing tab 152c. Further, the non-image processing tab 152a is selected on the non-image processing EWS screen 190. Further, among all the setting items for the non-image processing function, the non-image processing EWS screen 190 displays thereon setting items 156 such as "Device Status," "Remaining Toner Amount," and "Reload Interval," but does not display setting items 156 such as "Language" and "Device Location." Further, information regarding the setting item selected from among the displayed setting items 156 is displayed on the non-image processing EWS screen 190. Thus, when the link button 126 is operated on the scan processing execution screen 120, if the user is not allowed to execute the processing function (i.e., the scan processing function) corresponding to the scan processing execution screen 120, not the scan processing EWS screen but the non-image processing EWS screen is displayed. Thereby, it is possible to prohibit the EWS screen (i.e., the scan processing EWS screen) of the processing function (i.e., the scan processing function) which the user is not allowed to execute from being displayed. Furthermore, since the scan processing tab 152c is not displayed, it is possible to more certainly prohibit the scan processing EWS screen from being displayed.

Figure 12:
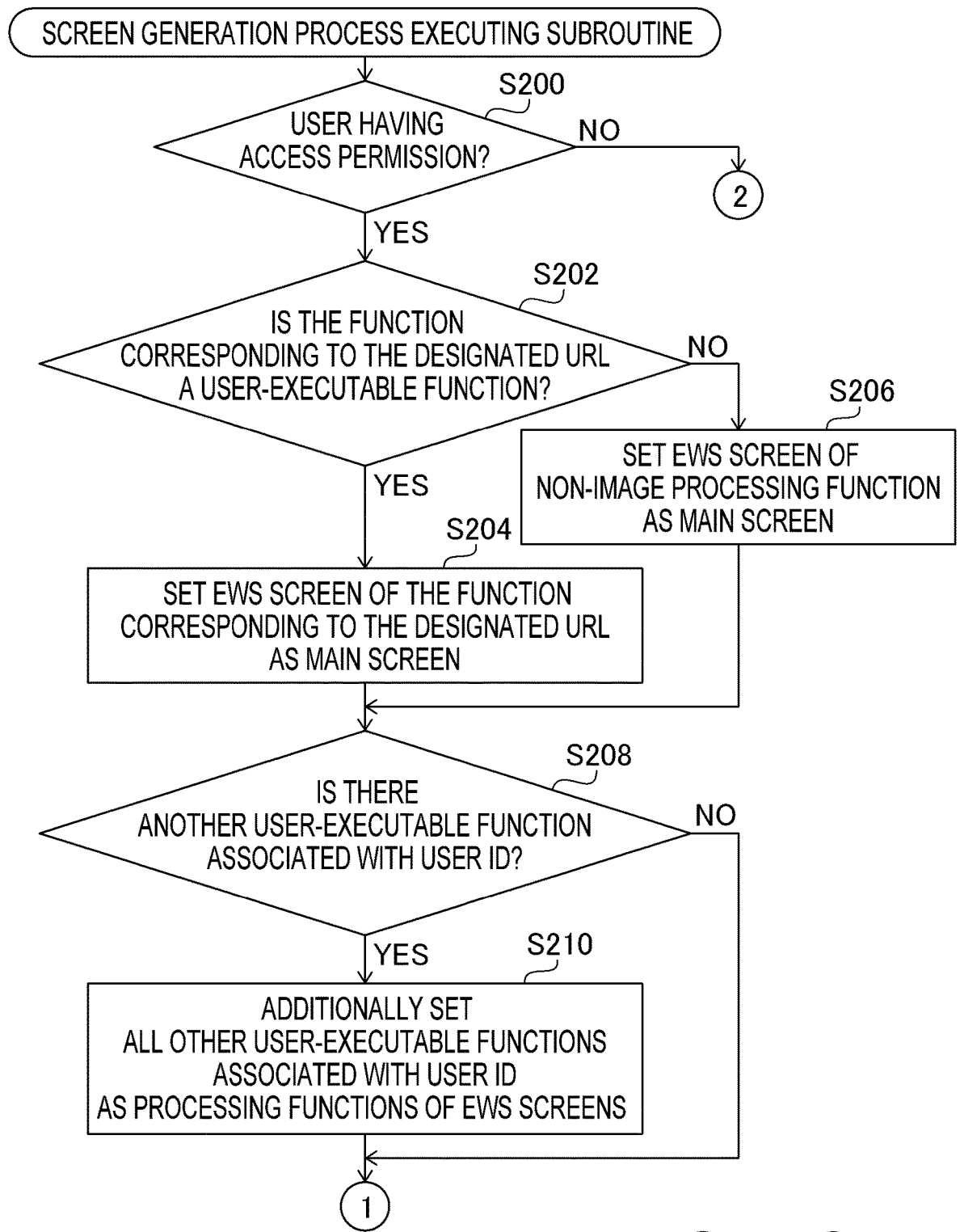
FIGS. 12 and 13 are flowcharts showing a procedure of a screen generation process execution subroutine according to a control program in the MFP, in the illustrative embodiment according to one or more aspects of the present disclosure.

In the screen generation process executing subroutine shown in FIGS. 12 and 13, when determining that the user who has sent the request information does not have access permission (S200: No), the control program 74 terminates the screen generation process executing subroutine without generating any image data of an EWS screen. In such a case, the control program 74 transmits not image data but error information to the PC 10 (S110), as shown in FIG. 11. Thereby, an error screen (not shown) is displayed on the PC 10 (S112).

The aforementioned illustrative embodiment produces the following advantageous effects.

When a link button (e.g., the link button 116 or 126) is operated when an image processing execution screen (e.g., the print processing execution screen 110 or the scan processing execution screen 120) is displayed on the LCD 16 of the PC 10, the control program 30 (more exactly, the CPU 12 executing the control program 30) obtains, from the MFP 50, the image data of the EWS screen of the image processing function (e.g., the print processing function or the scan processing function). Then, the control program 30 causes the LCD 16 to display the EWS screen based on the obtained image data. Further, when the link button 106 is operated while the home screen 100 is displayed on the LCD 16, the control program 30 obtains the image data of the EWS screen of the non-image processing function from the MFP 50. Then, the control program 30 causes the LCD 16 to display the EWS screen based on the obtained image data. This makes it possible to cause the LCD 16 to display the EWS screen corresponding to the input screen on which the link button has been operated, thereby improving the operability of the link button.

The control program 30 obtains the image data of the EWS screen from the EWS 70 of the MFP 50 by using the browser 32, and causes the LCD 16 to display the EWS screen based on the obtained image data. Thereby, it is possible to properly obtain the image data.

A tab is attached to each EWS screen. When obtaining image data of a plurality of EWS screens, the control program 30 causes the LCD 16 to display a specified one of the EWS screens in a state where a tab, which is attached to the specified EWS screen corresponding to the input screen on which the link button has been operated, is selected. Thereby, the user is allowed to view any EWS screen by operating a corresponding tab.

Further, in the map data shown in FIG. 16, the permission information is set for each user ID. The permission information represents how wide is a range of information (hereinafter referred to as "displayable information") regarding the processing functions that is authorized to be displayed. Specifically, the permission information is set to either "Administrator" having display permission for a wider range of displayable information or "General" having display permission for a narrower range of displayable information. Then, with respect to an arbitrary user ID, only information regarding processing functions within a range of displayable information as determined by the permission information associated with the arbitrary user ID is authorized to be displayed on the respective EWS screens corresponding to the said processing functions. Thereby, each user is allowed to view only the information regarding processing functions within the range of displayable information as determined by the permission information associated with the corresponding user ID. Further, the display permission is set for each of the setting items for each processing function. Then, with respect to an arbitrary user ID, only information regarding setting items for processing functions within the range of displayable information as determined by the permission information associated with the arbitrary user ID is authorized to be displayed on the respective EWS screens corresponding to the said processing functions. Thereby, each user is allowed to view only the information regarding the setting items for processing functions within the range of displayable information as determined by the permission information associated with the corresponding user ID.

Further, in the map data shown in FIG. 15, the user-executable functions are set for each user ID. The user-executable functions set for each user ID are functions executable by the user identified by each user ID. Then, with respect to an arbitrary user ID, the EWS screens corresponding to processing functions included in the user-executable functions associated with the arbitrary user ID are authorized to be displayed. Meanwhile, the EWS screens corresponding to processing functions that are not included in the user-executable functions associated with the arbitrary user ID are not authorized to be displayed. Thereby, each user is allowed to view only the EWS screens corresponding to the user-executable functions set for each user.

Further, in the map data shown in FIG. 14, a password is set for each user ID. Therefore, when the combination of the user ID and the password of the user who is using the PC 10 matches the combination of a user ID and a password associated with each other in the map data, it is determined that the user has access permission. Then, the EWS screens are authorized to be displayed on the PC 10 only when the user has the access permission. Meanwhile, the EWS screens are not authorized to be displayed on the PC 10 when the user does not have the access permission. Thereby, only users having access permission are allowed to view the EWS screens.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications may be feasible.

In the aforementioned illustrative embodiment, the map data shown in FIGS. 14 to 17 are stored in MFP 50. Further, the information displayable on the PC 10 is selected by the MFP 50. However, the map data as shown in FIGS. 14 to 17 may be stored in the PC 10. Further, the information displayable on the PC 10 may be selected by the PC 10. In this case, the MFP 50 may transmit all the image data of the EWS screens to the PC 10. Further, the PC 10 may select the information displayable on the PC 10 from the image data received from the MFP, based on the map data stored in the PC 10.

In the aforementioned illustrative embodiment, the EWS information is stored in the EWS 70 of the MFP 50. However, the EWS information may be stored in a device (e.g., a server) different from the MFP 50. In this case, the PC 10 may obtain the EWS information from the server via the MFP 50 or directly from the server.

In the aforementioned illustrative embodiment, the processes shown in FIGS. 11 to 13 are performed by the CPU 12 of the PC 10 and the CPU 52 of the MFP 50. However, for instance, these processes may be performed by ASICs and/or other logical integrated circuits. In another instance, at least two of CPUs, ASICs, and logical integrated circuits may perform these processes in cooperation with each other.

The following shows examples of associations between elements exemplified in the aforementioned illustrative embodiments and modifications and elements according to aspects of the present disclosure. The communication system 1 may be an example of a "communication system" according to aspects of the present disclosure. The PC 10 may be an example of an "information processing device" according to aspects of the present disclosure. The MFP 50 may be an example of an "image processing device" according to aspects of the present disclosure. The CPU 12 may be an example of a "processor" of the "information processing device" according to aspects of the present disclosure. The memory 14 storing the control program 30 may be an example of a "non-transitory computer-readable medium" storing "computer-readable instructions" according to aspects of the present disclosure, and may be an example of a "memory" storing "computer-readable instructions" according to aspects of the present disclosure. The CPU 12 and the memory 14 storing the control program 30 may be included in a "controller" according to aspects of the present disclosure, and may be included in a "first controller" according to aspects of the present disclosure. The LCD 16 may be an example of a "display" according to aspects of the present disclosure. The input I/F 18 may be an example of a "user interface" according to aspects of the present disclosure. The communication I/F 20 may be an example of a "communication interface" according to aspects of the present disclosure, and may be an example of a "first communication interface" according to aspects of the present disclosure. The browser 32 may be an example of a "browser" according to aspects of the present disclosure. The communication I/F 68 may be an example of a "second communication interface" according to aspects of the present disclosure. The CPU 52 and the memory 54 storing the control program 74 may be included in a "second controller" according to aspects of the present disclosure. The EWS 70 may be an example of a "server" according to aspects of the present disclosure. The home screen 100, the print processing execution screen 110, and the scan processing execution screen 120 may be included in examples of an "input screen" according to aspects of the present disclosure. The permission information may be an example of "display permission information" according to aspects of the present disclosure. The permission information "Administrator" may be an example of "first display permission information" according to aspects of the present disclosure. The permission information "General" may be an example of "second display permission information" according to aspects of the present disclosure.

What is claimed is:

1. A non-transitory computer-readable medium storing computer-readable instructions executable by a processor of an information processing device comprising a communication interface and a display, the instructions being configured to, when executed by the processor, cause the information processing device to:

control the display to display one of a plurality of input screens, each of which is configured to accept an instruction to cause an image processing device to perform a particular function, the plurality of input screens including
an image processing input screen configured to accept an instruction to cause the image processing device to perform a specified image processing function as the particular function, and
a non-image processing input screen configured to accept an instruction to cause the image processing device to perform a non-image processing function as the particular function;

transmit an image data request to the image processing device via the communication interface while one of the plurality of input screens is displayed on the display; and in response to transmission of the image data request, determine whether the input screen displayed when the image data request has been transmitted is the image processing input screen or the non-image processing input screen, thereby obtaining image data of a screen image regarding the particular function that varies depending on whether the input screen displayed when the image data request has been transmitted is the image processing input screen or the non-imaging processing input screen;

wherein the information processing device obtains image data of an image processing screen image regarding the specified image processing function from the image processing device via the communication interface and controls the display to display the image processing screen image, when transmitting the image data request to the image processing device via the communication interface while the image processing input screen is displayed as the input screen on the display, and wherein the information processing device obtains image data of a non-image processing screen image regarding the non-image processing function from the image processing device via the communication interface and controls the display to display the non-image processing screen image, when transmitting the image data request to the image processing device via the communication interface while the non-image processing input screen is displayed as the input screen on the display.

2. The non-transitory computer-readable medium according to claim 1, wherein the information processing device further comprises a browser configured to obtain image data using a URL from a server included in the image processing device, and wherein the instructions are further configured to, when executed by the processor, cause the information processing device to:

obtain, from the server, the image data of the image processing screen image regarding the specified image processing function and control the display to display the image processing screen image, when transmitting to the image processing device the image data request with designation of a URL corresponding to the specified image processing function; and obtain, from the server, the image data of the non-image processing screen image regarding the non-image processing function and control the display to display the non-image processing screen image, when transmitting to the image processing device the image data request with designation of a URL corresponding to the non-image processing function.

3. The non-transitory computer-readable medium according to claim 1, wherein the instructions are further configured to, when executed by the processor, cause the information processing device to:

obtain, from the server, the image data in which a first tab is associated with a first image processing screen image as the image processing screen image regarding the specified image processing function, and a second tab is associated with a second image processing screen image regarding another image processing function; and control the display to display the first image processing screen image with the first tab selected, based on the obtained image data.

4. The non-transitory computer-readable medium according to claim 1, wherein display permission information is settable for each identification information for identifying a corresponding user of the information processing device, and wherein the instructions are further configured to, when executed by the processor, cause the information processing device to:

control the display to display the image processing screen image regarding the specified image processing function, when the display permission information, set for identification information of a user who has transmitted the image data request to the image processing device, represents that the image processing screen image is authorized to be displayed on the display; and control the display not to display the image processing screen image regarding the specified image processing function, when the display permission information, set for the identification information of the user, represents that the image processing screen image is not authorized to be displayed on the display.

5. The non-transitory computer-readable medium according to claim 4, wherein the specified image processing function has a plurality of setting items therefor, wherein the display permission information represents whether each of the plurality of setting items for the specified image processing function is authorized to be displayed on the display, and wherein the instructions are further configured to, when executed by the processor, cause the information processing device to:

control the display to display at least one but not all of the plurality of setting items for the specified image processing function and not display the other setting items for the specified image processing function, when the display permission information, set for the identification information of the user who has transmitted the image data request to the image processing device, represents that the said at least one but not all of the plurality of setting items for the specified image processing function are authorized to be displayed on the display.

6. The non-transitory computer-readable medium according to claim 5, wherein the display permission information, for each identification information for identifying the corresponding user of the information processing device, is settable to one of:

first display permission information representing that a plurality of image processing screen images regarding a plurality of image processing functions executable by the image processing device are authorized to be displayed on the display; and second display permission information representing that not all of the plurality of image processing screen images regarding the plurality of image processing functions executable by the image processing device are authorized to be displayed on the display.

7. The non-transitory computer-readable medium according to claim 1, wherein user-executable function information is set for each identification information for identifying a corresponding user of the information processing device, the user-executable function information representing one or more image processing functions executable by the corresponding user among all image processing functions executable by the image processing device, and wherein the instructions are further configured to, when executed by the processor, cause the information processing device to:

control the display to display the image processing screen image regarding the specified image processing function, when the one or more image processing functions, represented by the user-executable function information set for the identification information of a user who has transmitted the image data request to the image processing device, include the specified image processing function; and control the display not to display the image processing screen image regarding the specified image processing function, when the one or more image processing functions, represented by the user-executable function information set for the identification information of the user, do not include the specified image processing function.

8. The non-transitory computer-readable medium according to claim 1, wherein access permission information is set for each identification information for identifying a corresponding user of the information processing device, the access permission information representing whether the corresponding user is authorized to access the image processing device, and wherein the instructions are further configured to, when executed by the processor, cause the information processing device to:

obtain, from the image processing device, the image data of the image processing screen image regarding the specified image processing function and control the display to display the image processing screen image, when the access permission information, set for the identification information of a user who has transmitted the image data request to the image processing device, represents that the user is authorized to access the image processing device; and control the display not to display the image processing screen image, when the access permission information, set for the identification information of the user, does not represent that the user is authorized to access the image processing device.

9. An information processing device comprising:

a communication interface configured to communicate with an image processing device;

a display; and a controller configured to control the display to display one of a plurality of input screens, each of which is configured to accept an instruction to cause the image processing device to perform a particular function, the plurality of input screens including an image processing input screen configured to accept an instruction to cause the image processing device to perform a specified image processing function as the particular function, and a non-image processing input screen configured to accept an instruction to cause the image processing device to perform a non-image processing function as the particular function, transmit an image data request to the image processing device via the communication interface while one of the plurality of input screens is displayed on the display, and in response to transmission of the image data request, determine whether the input screen displayed when the image data request has been transmitted is the image processing input screen or the non-image processing input screen, thereby obtaining image data of a screen image regarding the particular function that varies depending on whether the input screen displayed when the image data request has been transmitted is the image processing input screen or the non-imaging processing input screen, wherein the information processing device obtains, from the image processing device, image data of an image processing screen image regarding the image processing function and controls the display to display the image processing screen image, when transmitting the image data request for image data of a display image to the image processing device while the image processing input screen is displayed as the input screen on the display, and wherein the information processing device obtains, from the image processing device, image data of the non-image processing screen image regarding a non-image processing function and controls the display to display the non-image processing screen image, when transmitting the image data request to the image processing device while the non-image processing input screen is displayed as the input screen on the display.

10. The information processing device according to claim 9, wherein the controller comprises:

a processor; and a memory storing computer-readable instructions configured to, when executed by the processor, cause the controller to:

control the display to display the input screen configured to accept the instruction to cause the image processing device to perform the particular function;

obtain, from the image processing device, the image data of the image processing screen image regarding the image processing function and control the display to display the image processing screen image, when transmitting the image data request to the image processing device while the image processing input screen is displayed as the input screen on the display; and obtain, from the image processing device, the image data of the non-image processing screen image regarding the non-image processing function and control the display to display the non-image processing screen image, when transmitting the image data request to the image processing device while the non-image processing input screen is displayed as the input screen on the display.

11. A communication system comprising:

an image processing device; and an information processing device comprising a first communication interface configured to communicate with the image processing device, a display, a user interface, and a first controller configured to control the display to display one of a plurality of input screens, each of which is configured to accept an instruction to cause the image processing device to perform a particular function, the plurality of input screens including an image processing input screen configured to accept an instruction to cause the image processing device to perform a specified image processing function as the particular function, and a non-image processing input screen configured to accept an instruction to cause the image processing device to perform a non-image processing function as the particular function, transmit an image data request to the image processing device via the communication interface while one of the plurality of input screens is displayed on the display, in response to transmission of the image data request, determine whether the input screen displayed when the image data request has been transmitted is the image processing input screen or the non-image processing input screen, thereby obtaining image data of a screen image regarding the particular function that varies depending on whether the input screen displayed when the image data request has been transmitted is the image processing input screen or the non-imaging processing input screen, transmit, to the image processing device, a request for image data of the image processing screen image regarding an image processing function, when accepting via the user interface a user operation to request image data of the display image while the image processing input screen is displayed as the input screen on the display, control the display to display the image processing screen image, when receiving the image data of the image processing screen image from the image processing device;

transmit, to the image processing device, a request for image data of a non-image processing screen image regarding the non-image processing function, when accepting via the user interface a user operation to request image data of a display image while the non-image processing input screen is displayed as the input screen on the display, and control the display to display the non-image processing screen image, when receiving the image data of the non-image processing screen image from the image processing device, wherein the image processing device comprises a second communication interface configured to communicate with the image processing device, and a second controller configured to transmit, to the information processing device, the image data of the image processing screen image regarding the image processing function, when receiving the request for the image data of the image processing screen image, and transmit, to the information processing device, the image data of the non-image processing screen image regarding the non-image processing function, when receiving the request for the image data of the non-image processing screen image.

* * * * *